United States Patent
Miyasaka

(10) Patent No.: US 10,857,668 B2
(45) Date of Patent: Dec. 8, 2020

(54) ROBOT, CONTROL DEVICE, AND ROBOT SYSTEM

(71) Applicant: Seiko Epson Corporation, Tokyo (JP)

(72) Inventor: Hidekatsu Miyasaka, Matsumoto (JP)

(73) Assignee: Seiko Epson Corporation

( * ) Notice: Subject to any disclaimer, the term of this patent is extended or adjusted under 35 U.S.C. 154(b) by 338 days.

(21) Appl. No.: 15/479,369

(22) Filed: Apr. 5, 2017

(65) Prior Publication Data

US 2017/0291297 A1 Oct. 12, 2017

(30) Foreign Application Priority Data

Apr. 6, 2016 (JP) .................................. 2016-076825

(51) Int. Cl.
*B25J 9/04* (2006.01)
*B25J 9/00* (2006.01)

(52) U.S. Cl.
CPC ............. *B25J 9/047* (2013.01); *B25J 9/0009* (2013.01); *B25J 9/046* (2013.01)

(58) Field of Classification Search
CPC ..... B25J 9/06; B25J 9/046; B25J 9/047; B25J 18/04; Y10S 901/15; Y10S 901/27
See application file for complete search history.

(56) References Cited

U.S. PATENT DOCUMENTS

| | | | |
|---|---|---|---|
| 3,922,930 A * | 12/1975 | Fletcher ............... | B25J 17/0283 74/665 B |
| 4,984,959 A * | 1/1991 | Kato ........................ | B25J 9/042 414/744.3 |
| 5,534,761 A * | 7/1996 | Crippa ..................... | B25J 9/042 318/568.1 |
| 5,661,387 A * | 8/1997 | Stadele ..................... | B25J 9/102 318/568.11 |
| 7,971,504 B2 * | 7/2011 | Haniya .................. | B25J 9/0087 74/490.03 |
| 8,062,288 B2 * | 11/2011 | Cooper .................. | A61B 34/30 606/1 |
| 8,104,372 B2 * | 1/2012 | Meyerhoff ............... | B25J 9/044 74/490.01 |

(Continued)

FOREIGN PATENT DOCUMENTS

| CN | 105965505 A * | 9/2016 | ............ B25J 9/1633 |
|---|---|---|---|
| JP | 2014-046401 A | 3/2014 | |

(Continued)

*Primary Examiner* — Bobby Rushing, Jr.

(74) *Attorney, Agent, or Firm* — Harness, Dickey & Pierce, P.L.C.

(57) ABSTRACT

A robot includes: a manipulator that is provided with an n-th (n is an integer of 1 or larger) arm which is capable of rotating around an n-th rotation axis, an (n+1)-th arm provided on the n-th arm to be capable of rotating around an (n+1)-th rotation axis having an axial direction which is different from an axial direction of the n-th rotation axis, and an (n+2)-th arm provided on the (n+1)-th arm to be capable of rotating around an (n+2)-th rotation axis. In a first state, an outline of the manipulator is positioned on an inner side of a first circle or on the first circle with the n-th rotation axis as the center thereof, and with first length between a distal end of the manipulator and the n-th rotation axis, as a radius, when viewed in the axial direction of the n-th rotation axis.

11 Claims, 15 Drawing Sheets

(56) References Cited

U.S. PATENT DOCUMENTS

| | | | |
|---|---|---|---|
| 9,037,293 B2 | 5/2015 | Gomi et al. | |
| 2003/0221504 A1 | 12/2003 | Stoianovici et al. | |
| 2012/0260854 A1* | 10/2012 | Takebe | B25J 5/02 |
| | | | 118/500 |
| 2012/0321426 A1* | 12/2012 | Tanaka | H01L 21/67766 |
| | | | 414/728 |
| 2013/0125696 A1* | 5/2013 | Long | B25J 18/04 |
| | | | 74/490.05 |
| 2013/0325029 A1* | 12/2013 | Hourtash | A61B 34/30 |
| | | | 606/130 |
| 2016/0288335 A1 | 10/2016 | Akaha et al. | |
| 2016/0288336 A1 | 10/2016 | Toshimitsu et al. | |
| 2016/0288339 A1 | 10/2016 | Akaha | |
| 2016/0288340 A1 | 10/2016 | Akaha et al. | |
| 2016/0288341 A1 | 10/2016 | Akaha | |
| 2016/0288342 A1 | 10/2016 | Akaha | |
| 2016/0318180 A1 | 11/2016 | Miyasaka | |
| 2016/0325400 A1* | 11/2016 | Murakami | B25J 21/00 |

FOREIGN PATENT DOCUMENTS

| | | |
|---|---|---|
| JP | 2016-190293 A | 11/2016 |
| JP | 2016-190294 A | 11/2016 |
| JP | 2016-190295 A | 11/2016 |
| JP | 2016-190296 A | 11/2016 |
| JP | 2016-190297 A | 11/2016 |
| JP | 2016-190298 A | 11/2016 |
| JP | 2016-203344 A | 12/2016 |
| JP | 2016-203345 A | 12/2016 |

* cited by examiner

ROBOT, CONTROL DEVICE, AND ROBOT SYSTEM

BACKGROUND

1. Technical Field

The present invention relates to a robot, a control device, and a robot system.

2. Related Art

In the related art, a robot that includes a robotic arm is known. The robotic arm is provided with a plurality of arms that are connected via joints, and an arm on the most distal end side is provided with, for example, a hand as an end effector. The joints are driven by a motor, and the arms rotate by the drive of the joints. For example, the robot grips a target object with the hand, causes the target object to move to a predetermined position, and performs predetermined work such as assembly.

JP-A-2014-46401 discloses a vertical articulated robot as the robot. The robot disclosed in JP-A-2014-46401 has a configuration in which, when a hand is caused to move, with respect to a base, to a position different by 180° around a first rotating shaft as a rotating shaft on the most proximal side (a rotating shaft extending in a vertical direction), a first arm as an arm on the most proximal side (base side) is caused to rotate around the first rotating shaft with respect to the base.

However, the robot disclosed in JP-A-2014-46401 needs to secure a large space such that the robot is prevented from interference in a case where the hand is caused to move to the position different by 180° around the first rotating shaft with respect to the base.

SUMMARY

Aspects of the invention are as follows.

A robot according to an aspect of the invention includes: a manipulator that is provided with an n-th (n is an integer of 1 or larger) arm which is capable of rotating around an n-th rotation axis, an (n+1)-th arm provided on the n-th arm so as to be capable of rotating around an (n+1)-th rotation axis having an axial direction which is different from an axial direction of the n-th rotation axis, and an (n+2)-th arm provided on the (n+1)-th arm so as to be capable of rotating around an (n+2)-th rotation axis. It is possible to overlap the n-th arm and the (n+1)-th arm, and it is possible to overlap the (n+1)-th arm and the (n+2)-th arm, when viewed in the axial direction of the (n+1)-th rotation axis. The (n+1)-th rotation axis is separated from the n-th rotation axis, when viewed in the axial direction of the (n+1)-th rotation axis. The (n+1)-th arm and the (n+2)-th arm overlap each other, when viewed in the axial direction of the (n+1)-th rotation axis, an outline of the manipulator is positioned on an inner side of a first circle or on the first circle formed with the n-th rotation axis as the center thereof, and with a first length between a distal end of the manipulator and the n-th rotation axis, as a radius, when viewed in the axial direction of the n-th rotation axis, in a first state in which a first line connecting the (n+1)-th rotation axis and the (n+2)-th rotation axis is orthogonal to the n-th rotation axis.

According to the robot of the aspect of the invention, it is possible to reduce a space in which the robot is prevented from interference, and it is possible to efficiently perform various types of work while avoiding interference with the robot itself (for example, the n-th arm) or peripheral equipment even in a relatively narrow space.

In the robot of the aspect of the invention, it is preferable that the manipulator is provided with a robotic arm that includes the n-th arm, the (n+1)-th arm, and the (n+2)-th arm, and an end effector that is provided on the robotic arm, and, in the first state, an outline of the robotic arm is positioned on an inner side of a second circle or on the second circle formed with the n-th rotation axis as the center thereof, and with a second length between a distal end of the robotic arm and the first rotation axis, as a radius, when viewed in the axial direction of the n-th rotation axis.

With this configuration, regardless of a type, a shape, or the like of manipulator, it is possible to efficiently perform various types of work while avoiding interference with the robot itself or peripheral equipment.

In the robot of the aspect of the invention, it is preferable that the n-th arm is longer than the (n+1)-th arm in length.

With this configuration, when the n-th arm and the (n+1)-th arm overlap each other, in a view in the axial direction of the (n+1)-th rotation axis, it is possible for the (n+1)-th arm to avoid interference with the n-th arm.

In the robot of the aspect of the invention, it is preferable that the n-th arm (n is 1) is provided on the base.

With this configuration, it is possible for the n-th arm to rotate with respect to the base. In addition, the n-th arm and the (n+1)-th arm, which are able to overlap each other, are a first arm that is provided on the base, and a second arm connected to the first arm, respectively, and thereby it is possible to reduce the space in which the robot is prevented from interference.

In the robot of the aspect of the invention, it is preferable that an angle between a second line connecting the (n+1)-th rotation axis and a connection portion between the n-th arm and the base, and the n-th rotation axis is larger than 0° and smaller than 45° when viewed in the axial direction of the (n+1)-th rotation axis.

With this configuration, it is possible for the manipulator to stably operate, and it is possible to broaden a range in the vicinity of the base in which the distal end of the manipulator can move while avoiding interference with the robot itself (for example, the base or the n-th arm) or peripheral equipment.

In the robot of the aspect of the invention, it is preferable that the angle is larger than 5° and smaller than 30°.

With this configuration, it is possible for the manipulator to more stably operate, and it is possible to broaden a range in the vicinity of the base in which the distal end of the manipulator can move while avoiding interference with the robot itself (for example, the n-th arm).

In the robot of the aspect of the invention, it is preferable that the (n+1)-th rotation axis is parallel to the (n+2)-th rotation axis.

With this configuration, it is possible to efficiently overlap the (n+1)-th arm and the (n+2)-th arm, when viewed in the axial direction of the (n+1)-th rotation axis, and it is possible to efficiently perform various types of work while avoiding interference with the robot.

A control device according to an aspect of the invention controls actuation of the robot of the aspect of the invention.

According to the control device of the aspect of the invention, the robot of the aspect of the invention has a configuration in which it is possible to efficiently perform various types of work while avoiding interference with the robot itself or peripheral equipment even in a relatively narrow space, and thereby it is easy to perform the control.

Therefore, it is possible for the control device to have a relatively simple configuration.

A robot system according to an aspect of the invention includes: the robot of the aspect of the invention; and a control device that controls actuation of the robot.

According to the robot system of the aspect of the invention, since the robot system includes the robot of the aspect of the invention, it is possible to efficiently perform various types of work while avoiding interference with the robot itself or peripheral equipment even in a relatively narrow space.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot, a control device, and a robot system according to the invention will be described in detail on the basis of exemplary embodiments illustrated in the accompanying figures.

Robot System

First Embodiment

Figure 1:
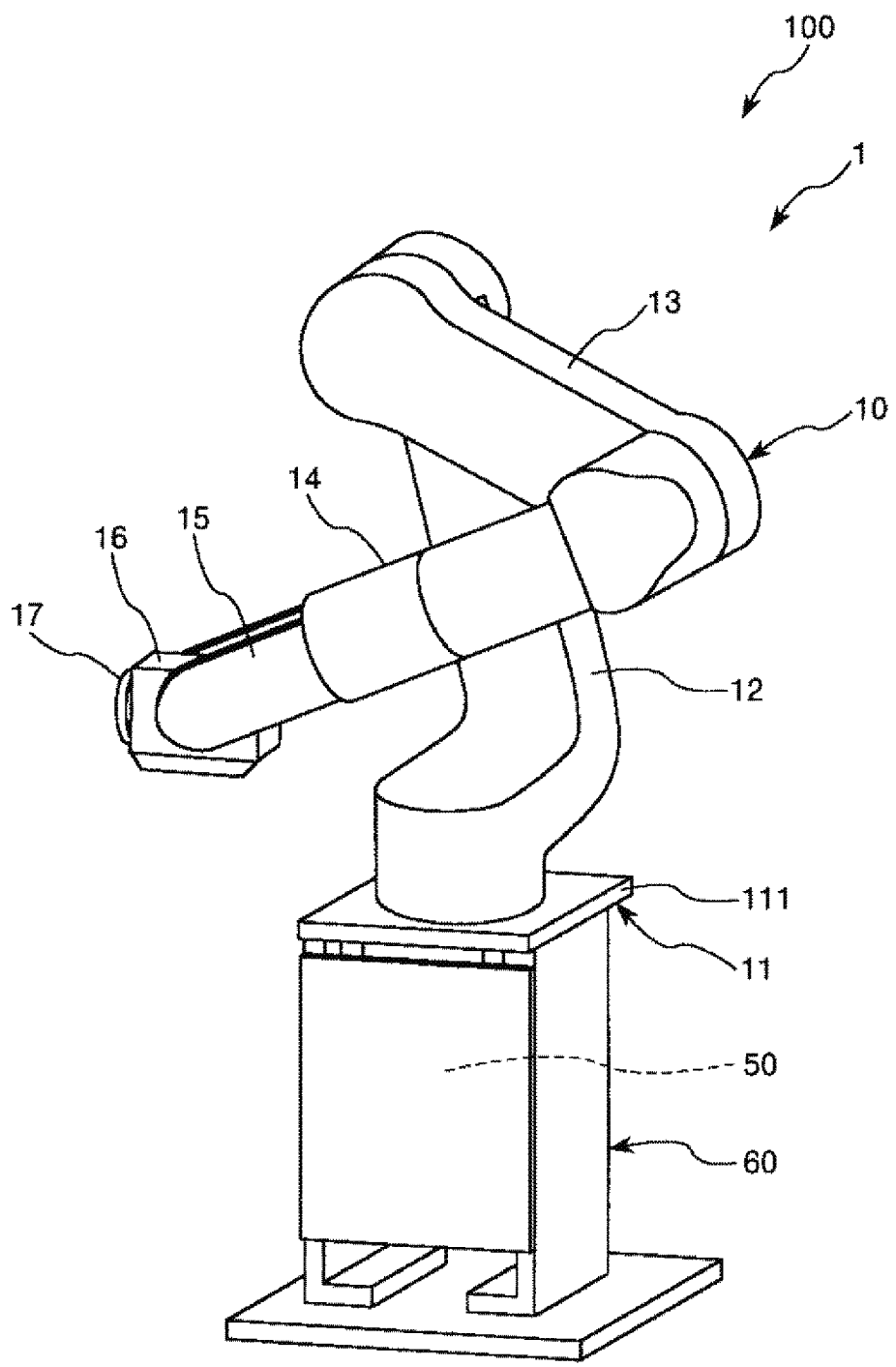
FIG. 1 is a perspective view schematically illustrating a robot system according to a first embodiment of the invention.
Figure 2:
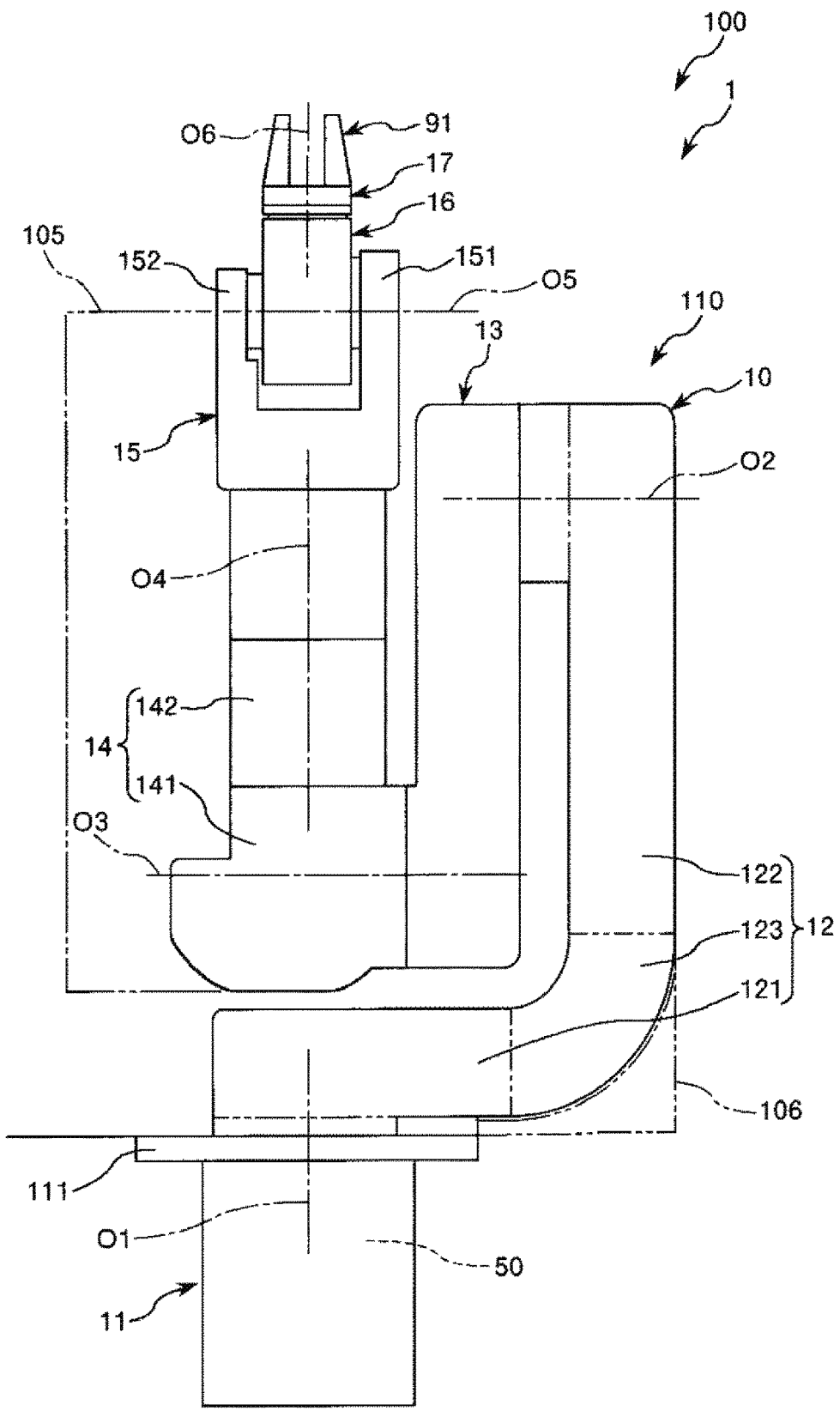
FIG. 2 is a schematic front view of the robot system illustrated in FIG. 1.
Figure 3:
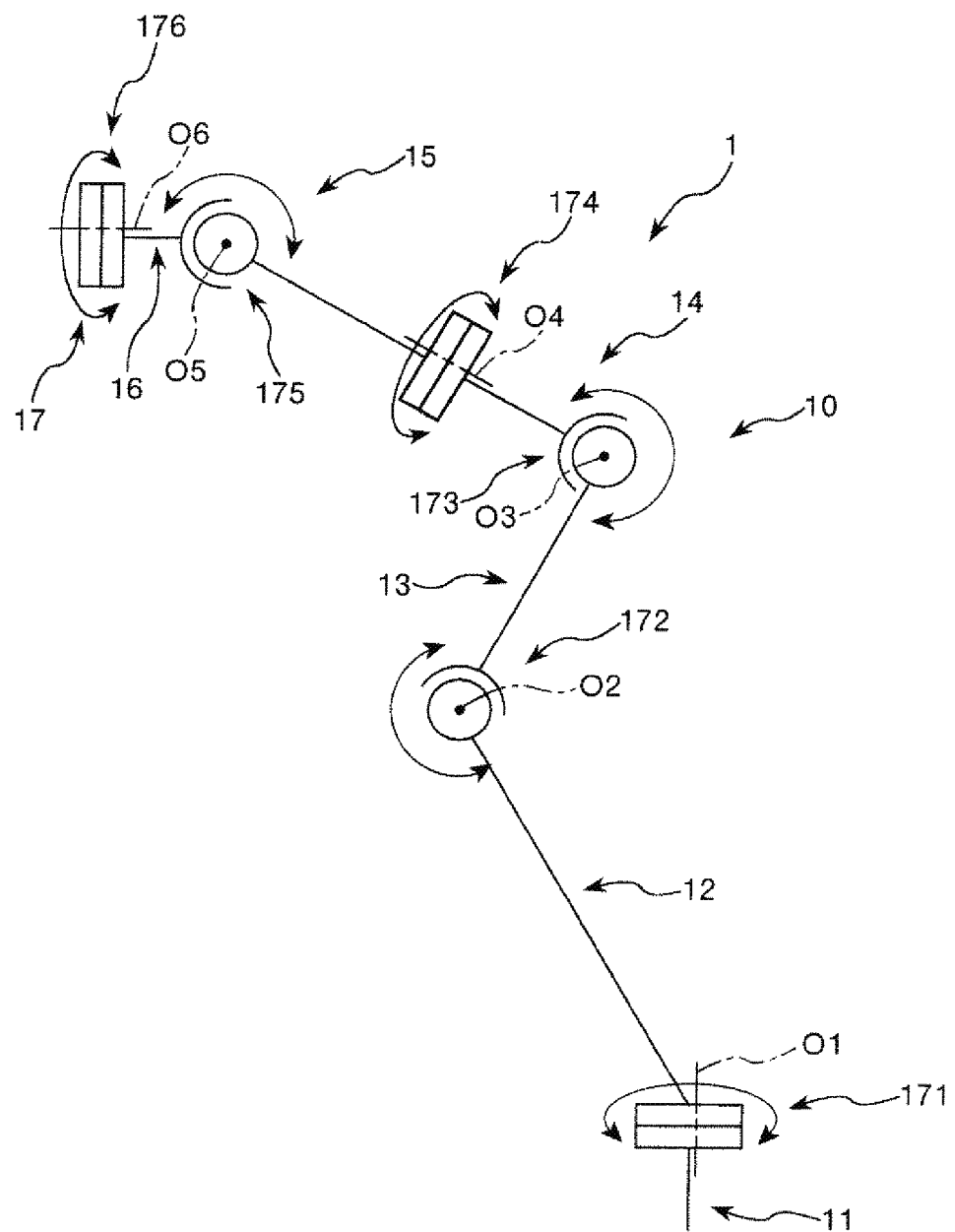
FIG. 3 is a schematic diagram of a robot illustrated in FIG. 1.
Figure 4:
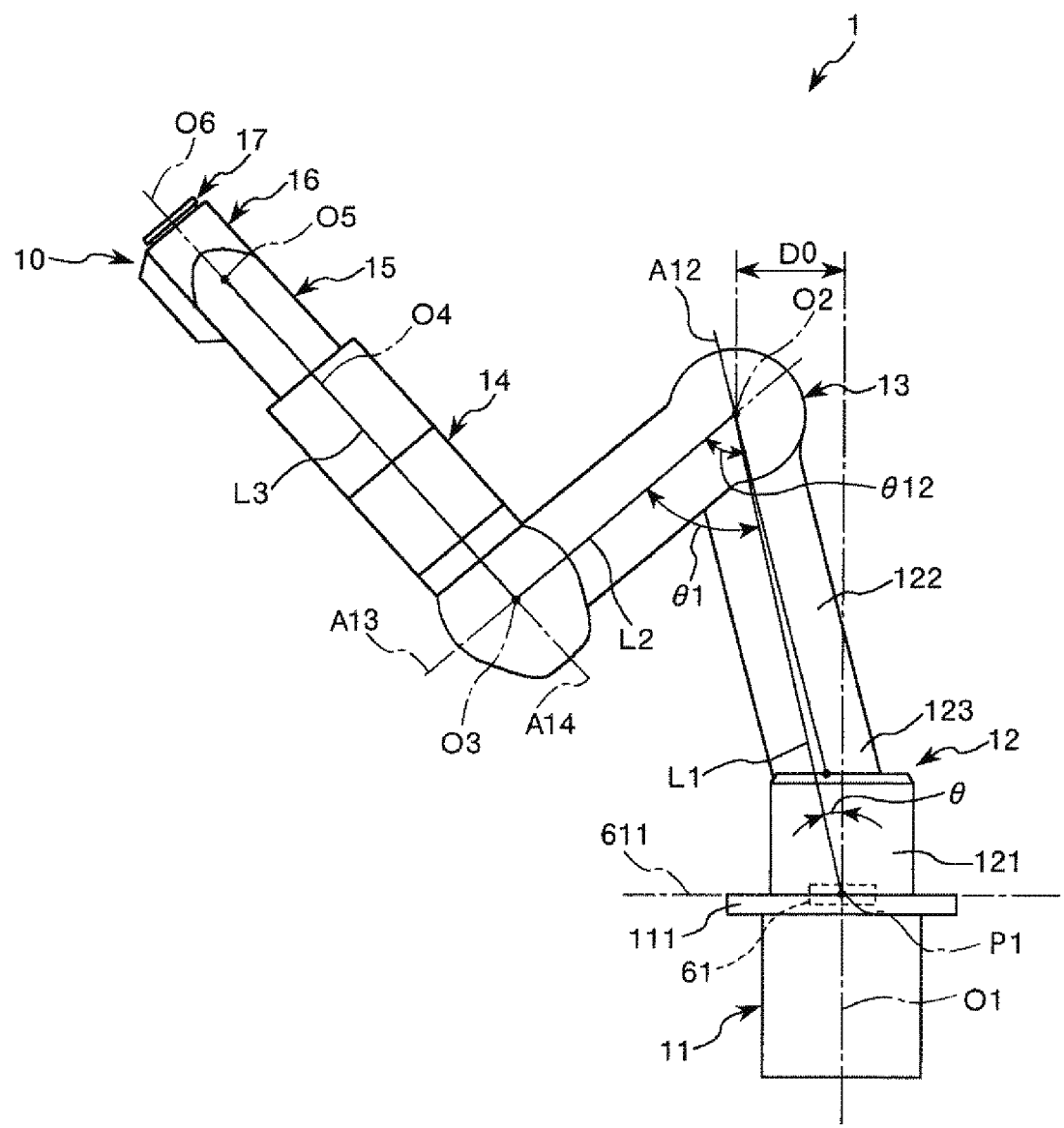
FIG. 4 is a schematic side view illustrating a state in which a first arm, a second arm, and a third arm of the robot illustrated in FIG. 1 do not overlap each other.
Figure 5:
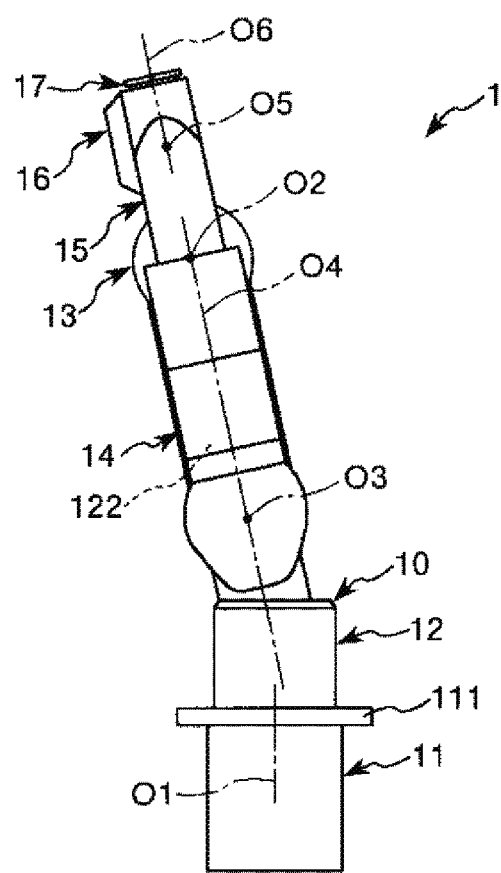
FIG. 5 is a schematic side view illustrating a state in which the first arm, the second arm, and the third arm of the robot illustrated in FIG. 1 overlap each other.
Figure 6:
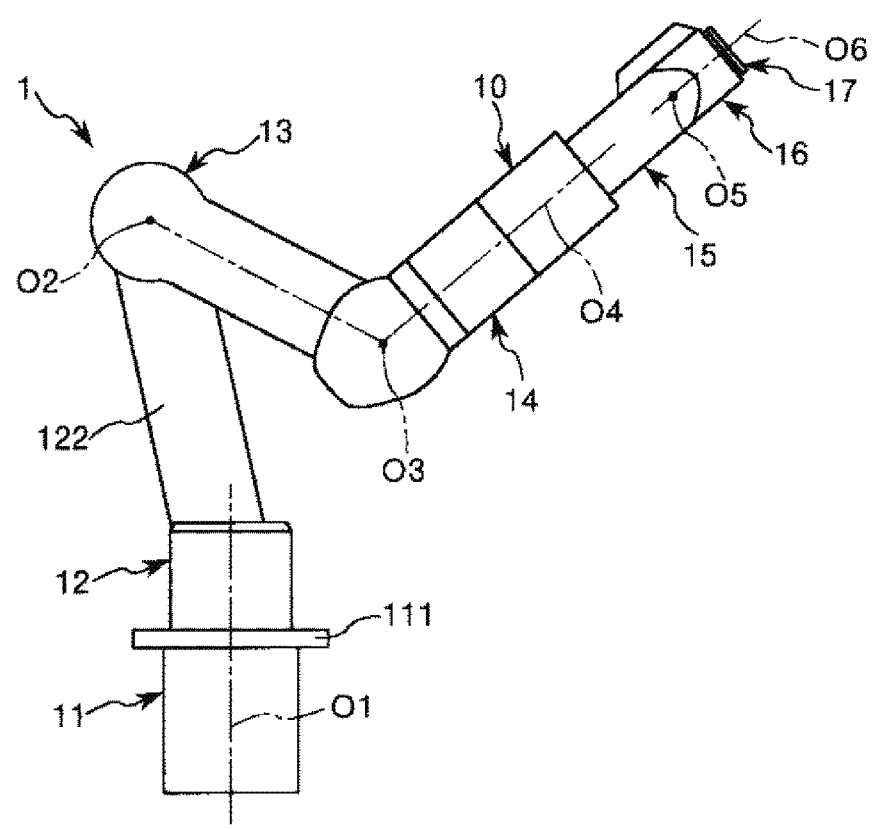
FIG. 6 is a schematic side view illustrating a state in which the first arm, the second arm, and the third arm of the robot illustrated in FIG. 1 do not overlap each other.

FIG. 1 is a perspective view schematically illustrating the robot system according to a first embodiment of the invention. FIG. 2 is a schematic front view of the robot system illustrated in FIG. 1. FIG. 3 is a schematic diagram of the robot illustrated in FIG. 1. FIG. 4 is a schematic side view illustrating a state in which a first arm, a second arm, and a third arm of the robot illustrated in FIG. 1 do not overlap each other. FIG. 5 is a schematic side view illustrating a state in which the first arm, the second arm, and the third arm of the robot illustrated in FIG. 1 overlap each other. FIG. 6 is a schematic side view illustrating a state in which the first arm, the second arm, and the third arm of the robot illustrated in FIG. 1 do not overlap each other.

Note that, hereinafter, for convenience of description, in FIGS. 2 to 6, an upper side is referred to as "on" or "above", and a lower side means "under" or "below". In addition, in FIGS. 2 to 6, an up-down direction means a "vertical direction", and a rightward-leftward direction means a "horizontal direction". In addition, in FIGS. 1 to 6, a base side means a "proximal end", and an opposite side (hand side) means a "distal end". Note that the same is true of FIGS. 8, 10 to 13, 15, 16, 18, and 19 which will be described below. In addition, a hand 91 is omitted in FIGS. 1 and 3 to 6. Similarly, the hand 91 is omitted in FIGS. 8, 10 to 13, 15, 16, 18, and 19 which will be described below.

In addition, in the specification, "parallel" to each other between two shafts includes a case where one shaft of the two shafts is inclined with respect to the other shaft in a range of 5° or smaller. In addition, in the specification, a "rotation axis" means to include an extended line thereof.

A robot system 100 illustrated in FIG. 1 can be used in, for example, manufacturing processes or the like in which a precision instrument or the like, such as a watch, is manufactured.

The robot system 100 includes a robot 1 and a robot control device 50 (control unit).

Robot Control Device

The robot control device 50 controls actuation of members of the robot 1. For example, the robot control device 50 may be configured of a personal computer (PC) or the like in which a central processing unit (CPU) is installed. The robot control device 50 is capable of sequentially controlling the operations of the members of the robot 1 in accordance with a predetermined program.

In the embodiment, the robot control device 50 is installed in a base 11 of the robot 1 which will be described below. The robot control device 50 may be provided in a portion other than the base 11 of the robot 1, and may be provided separately from the robot 1.

The robot control device 50, as an example of a control device according to the invention, controls the actuation of the robot 1 as an example of the robot according to the invention. The robot control device 50 is capable of appropriately controlling the robot 1 which will be described below. Since the robot 1 is configured to be easily controlled, it is possible to have a relatively simple configuration of the robot control device 50.

Robot

The robot 1 is able to perform various types of work such as supplying materials, removing materials, transporting and assembly of precision instruments or members (target objects) that configure the precision instruments.

As illustrated in FIG. 2, the robot 1 includes the base 11 and a manipulator 110. The manipulator 110 is provided with a robotic arm 10 and a hand 91 as an end effector that is provided on the distal end of the robotic arm 10.

The robotic arm 10 is provided with a first arm 12 (n-th arm), a second arm 13 ((n+1)-th arm), a third arm 14 ((n+2)-th arm), a fourth arm 15, a fifth arm 16, and a sixth arm 17. In other words, the robot 1 is a vertical articulated (six axes) robot in which the base 11, the first arm 12, the second arm 13, the third arm 14, the fourth arm 15, the fifth arm 16, and the sixth arm 17 are connected in this order from the proximal end side to the distal end side. Note that, hereinafter, each of the first arm 12, the second arm 13, the third arm 14, the fourth arm 15, the fifth arm 16, and the sixth arm 17 is also referred to as the "arm".

Base

In the embodiment, the robot 1 is installed on a floor as an installation surface, and the base 11 is positioned on the lowermost side of the robot 1. In other words, the robot 1 is a floor installation type vertical articulated robot in which the base 11 is positioned below the robotic arm 10 in the vertical direction.

As illustrated in FIG. 1, the base 11 is a portion (attached member) that is fixed to an attachment member 60 of the robot 1. The attachment member 60 is configured of a plurality of plate-shaped or bar-shaped support members which are combined. In the embodiment, a plate-shaped flange 111 provided on the upper portion of the base 11 is fixed to the upper portion of the attachment member 60. In this manner, the robot 1 is installed on the floor.

A portion of the base 11, which is fixed to the attachment member 60, is not limited to the flange 111, and the underside of the base 11 may be fixed thereto. In addition, there is no particular limitation on the fixing method to the attachment member 60, and, for example, it is possible to employ a fixing method using a plurality of bolts. In addition, a fixing position of the base 11 is not limited to the floor, and, for example, the base may be fixed to a ceiling, a wall, or the like. The robot 1 is the floor installation type vertical articulated robot; however, the robot may be a ceiling suspended type vertical articulated robot.

Manipulator

The manipulator 110 includes the robotic arm 10 and the hand 91, as described above.

As illustrated in FIG. 2, the robotic arm 10 is rotatably supported on the base 11. The arms 12 to 17 are supported to be capable of shifting individually with respect to the base 11.

As illustrated in FIG. 2, the first arm 12 has a bent shape. In addition, as illustrated in FIG. 4, the first arm 12 has a portion which is inclined with respect to a first rotation axis O1 which will be described below.

The first arm 12 includes a first portion 121 that is provided on the base 11 and extends in the horizontal direction (first direction), a second portion 122 that is provided on the second arm 13 and extends in an inclined direction (second direction different from the first direction) with respect to the horizontal direction and the vertical direction, and a third portion 123 that is positioned between the first portion 121 and the second portion 122 and extends in an inclined direction (a direction different from the first direction and the second direction) with respect to the horizontal direction and the vertical direction. More specifically, the first arm 12 is connected to the base 11, and includes the first portion 121 that extends upward from the base 11 in the vertical direction and then extends in the horizontal direction, the third portion 123 that extends upward from an end portion on a side opposite to a connection portion between the first portion 121 and the base 11 and away from the first portion 121 while being inclined in a direction in which the third portion extends away from the first portion 121, and the second portion 122 that extends upward from the distal end of the third portion 123 and away from the third portion 123 in an inclined direction with respect to the first rotation axis O1. Note that the first portion 121, the second portion 122, and the third portion 123 are integrally formed. In addition, the first portion 121 and the second portion 122 are substantially orthogonal to (intersecting with) each other when viewed from the front side of the paper surface of FIG. 2 (in a front view orthogonal to both of the first rotation axis O1 and a second rotation axis O2 which will be described below).

As illustrated in FIG. 2, the second arm 13 has a longitudinal shape and is connected to a distal end portion (end portion of the second portion 122, which is opposite to the third portion 123) of the first arm 12.

The third arm 14 has a longitudinal shape and is connected to an end portion of the second arm 13, which is opposite to the other end portion to which the first arm 12 is connected. The third arm 14 is connected to the second arm 13, and includes a first portion 141 extending from the second arm 13 in the horizontal direction, and a second portion 142 extending from the first portion 141 in the vertical direction. Note that the first portion 141 and the second portion 142 are integrally formed. In addition, the first portion 141 and the second portion 142 are substantially orthogonal to (intersecting with) each other when viewed from the front side of the paper surface of FIG. 2 (in a front view orthogonal to both of a third rotation axis O3 and a fourth rotation axis O4 which will be described below).

The fourth arm 15 is connected to an end portion of the third arm 14, which is opposite to the other end portion to which the second arm 13 is connected. The fourth arm 15 includes a pair of supports 151 and 152 which faces each other. The supports 151 and 152 are used in connection with the fifth arm 16.

The fifth arm 16 is positioned between the supports 151 and 152 and is connected to the supports 151 and 152, thereby being connected to the fourth arm 15. Note that the fourth arm 15 is not limited to such a structure, and, for example, the fourth arm may have one support (one-side support).

The sixth arm 17 has a flat plate shape and is connected to the distal end portion of the fifth arm 16. The hand 91 is detachably mounted on the distal end portion (end portion on a side opposite to the fifth arm 16) of the sixth arm 17. There is no particular limitation on the hand 91, and, for example, the hand may employ a configuration having a plurality of fingers. In addition, in the embodiment, the hand 91 is used as the end effector; however, the end effector is not limited thereto, and, for example, the end effector may be configured to include a mechanism of suctioning a member or the like.

Note that each of exterior portions (members that configure outlines) of the arms 12 to 17 may be configured of one member, or may be configured of a plurality of members.

The arms 12 to 17 are connected to one another via joints 171 to 176 (joint units).

As illustrated in FIG. 3, the base 11 and the first arm 12 are connected via the joint 171. The joint 171 has a mechanism (rotating shaft member) that supports the first arm 12 such that the first arm is rotatable with respect to the base 11. In this manner, the first arm 12 is capable of rotating, with respect to the base 11, around the first rotation axis O1 (n-th rotation axis), as the center, with the first rotation axis O1 which is parallel to the vertical direction.

The first arm 12 and the second arm 13 are connected via the joint 172. The joint 172 has a mechanism (rotating shaft member) that supports one of the first arm 12 and the second arm 13 which are connected to each other, such that the one is rotatable with respect to the other. In this manner, the second arm 13 is capable of rotating, with respect to the first arm 12, around the second rotation axis O2 ((n+1)-th rotation axis), as the center, with the second rotation axis O2 which is parallel to the horizontal direction. In addition, the second rotation axis O2 and the first rotation axis O1 are positioned at a torsional position. Therefore, as illustrated in FIG. 4, the second rotation axis O2 is separated from the first rotation axis O1 by a distance D0, when viewed in an axial direction of the second rotation axis O2.

As illustrated in FIG. 3, the second arm 13 and the third arm 14 are connected via the joint 173. The joint 173 has a mechanism (rotating shaft member) that supports one of the second arm 13 and the third arm 14 which are connected to each other, such that the one is rotatable with respect to the other. In this manner, the third arm 14 is capable of rotating, with respect to the second arm 13, around the third rotation axis O3, as the center, with the third rotation axis O3 which is parallel to the horizontal direction. In addition, in the embodiment, the third rotation axis O3 and the second rotation axis O2 are parallel to each other.

The third arm 14 and the fourth arm 15 are connected via the joint 174. The joint 174 has a mechanism (rotating shaft member) that supports one of the third arm 14 and the fourth arm 15 which are connected to each other, such that the one is rotatable with respect to the other. In this manner, the fourth arm 15 is capable of rotating, with respect to the third arm 14, around the fourth rotation axis O4, as the center, with the fourth rotation axis O4 which is parallel to a central axis direction of the third arm 14. Note that, even when the fourth rotation axis O4 is not orthogonal to the third rotation axis O3, axial directions thereof may be different.

The fourth arm 15 and the fifth arm 16 are connected via the joint 175. The joint 175 has a mechanism (rotating shaft member) that supports one of the fourth arm 15 and the fifth arm 16 which are connected to each other, such that the one is rotatable with respect to the other. In this manner, the fifth arm 16 is capable of rotating, with respect to the fourth arm 15, around the fifth rotation axis O5, as the center, with the fifth rotation axis O5 which is orthogonal to a central axis direction of the fourth arm 15. Note that, even when the fifth rotation axis O5 is not orthogonal to the fourth rotation axis O4, axial directions thereof may be different.

The fifth arm 16 and the sixth arm 17 are connected via the joint 176. The joint 176 has a mechanism (rotating shaft member) that supports one of the fifth arm 16 and the sixth arm 17 which are connected to each other, such that the one is rotatable with respect to the other. In this manner, the sixth arm 17 is capable of rotating, with respect to the fifth arm 16, around the sixth rotation axis O6, as the center, with the sixth rotation axis O6 which is orthogonal to the fifth rotation axis O5. Note that, even when the sixth rotation axis O6 is not orthogonal to the fifth rotation axis O5, axial directions thereof may be different.

In addition, each of the joints 171 to 176 is provided with a drive unit that includes a motor, such as a servomotor, and a deceleration device, although not illustrated. In other words, the robot 1 includes multiple (in the embodiment, six) drive units corresponding to the arms 12 to 17. The arms 12 to 17 are controlled by the robot control device 50 via a plurality of (in the embodiment, six) motor drivers which are electrically connected to the corresponding drive units, respectively, although not illustrated. The motor driver (not illustrated) is installed in the base 11.

As described above, a basic configuration of the robot 1 is described. As described above, since the robot 1 having such a configuration is the vertical articulated robot that includes six (the plurality of) arms 12 to 17, it is possible to exhibit high workability with a wide drive range. In addition, as described above, since the robot 1 is the floor installation type vertical articulated robot, it is possible to exhibit particularly high workability on a floor side and a side surface side as sides in the vertical direction from the robot 1.

Next, a configuration of the robotic arm 10 is specifically described with reference to FIGS. 4 to 12.

Figure 7:
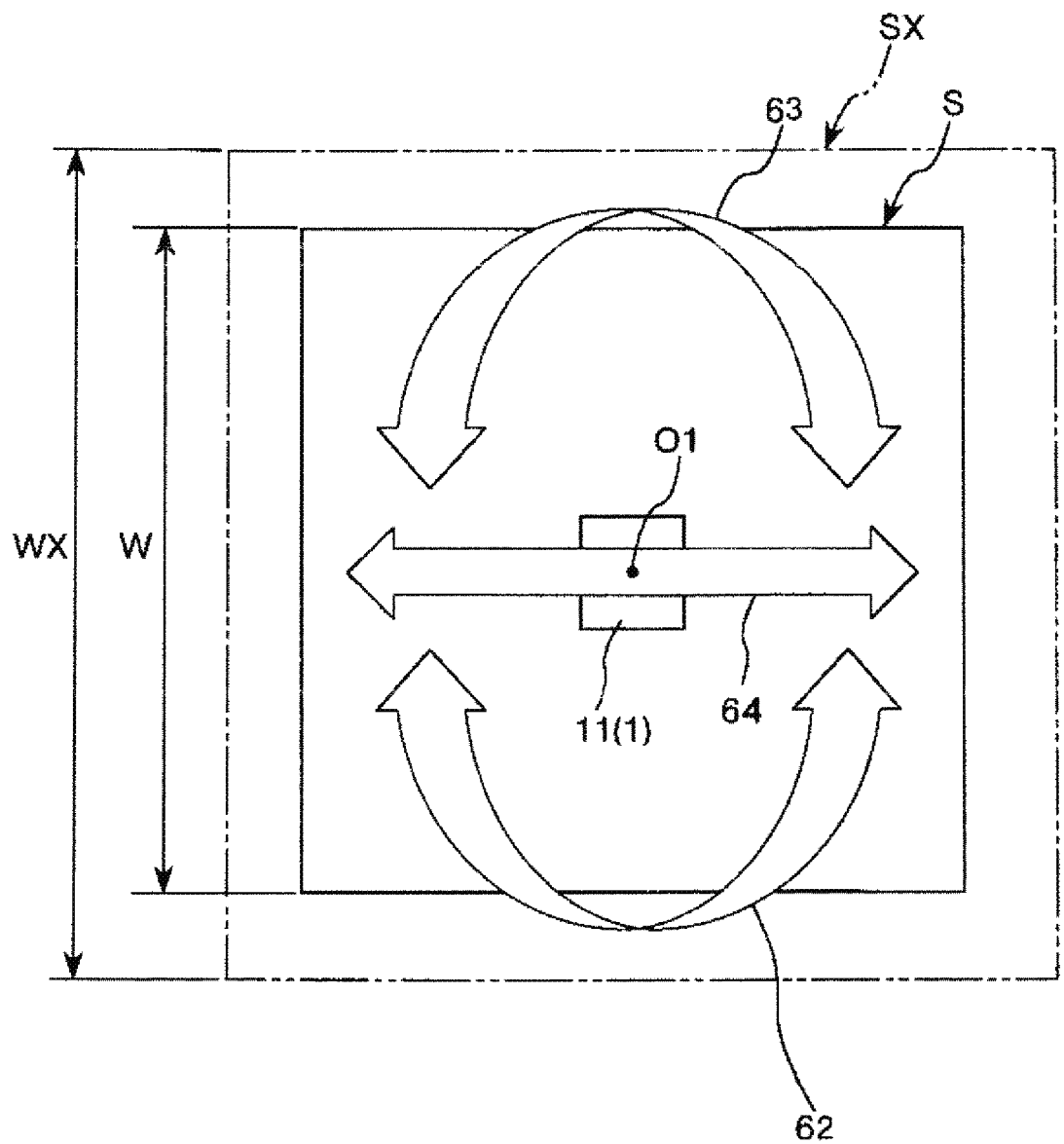
FIG. 7 is a diagram illustrating a moving route of a distal end of a robotic arm in an operation of the robot illustrated in FIGS. 4 to 6.
Figure 8:
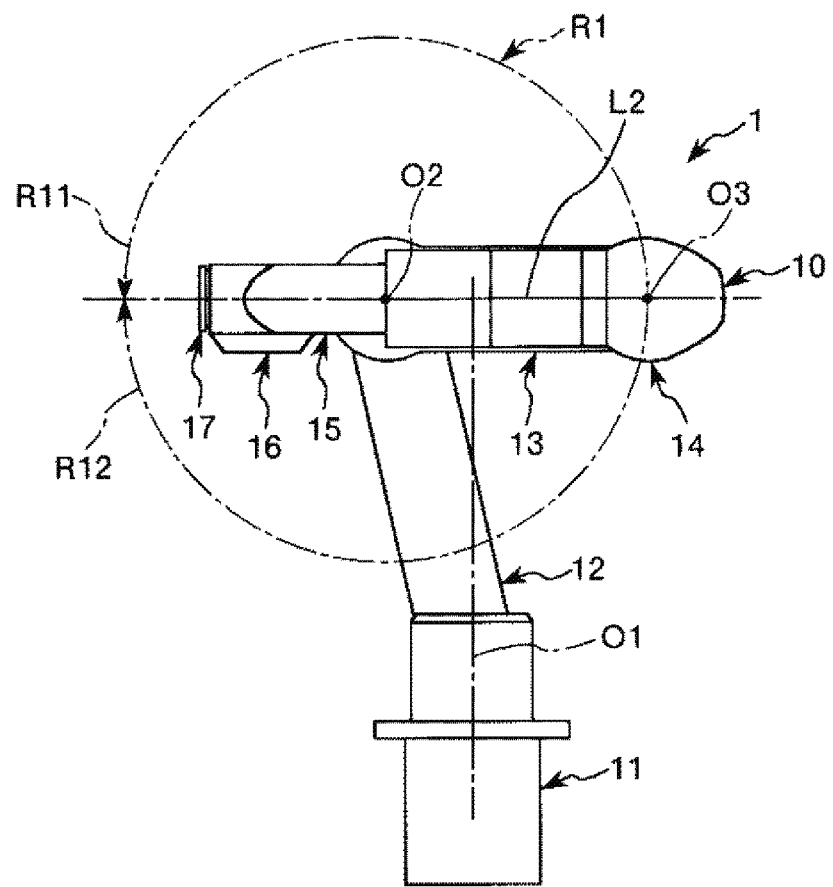
FIG. 8 is a schematic side view illustrating a first state of the robot illustrated in FIG. 1.
Figure 9:
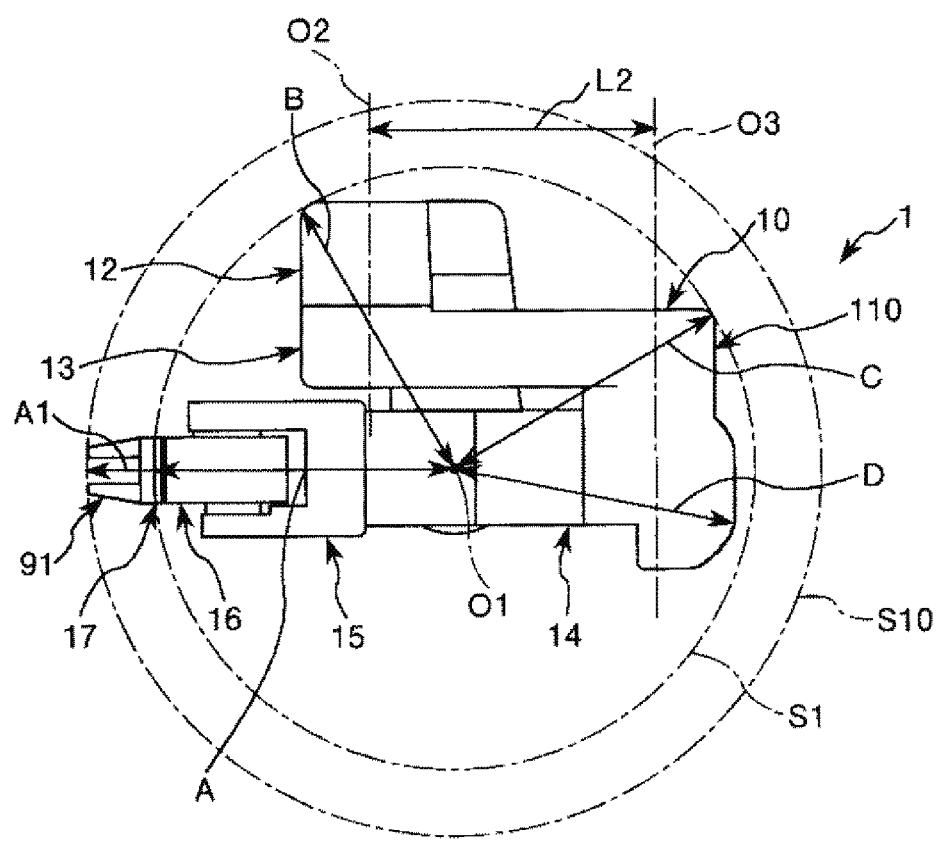
FIG. 9 is a schematic top view illustrating the first state of the robot illustrated in FIG. 1.
Figure 10:
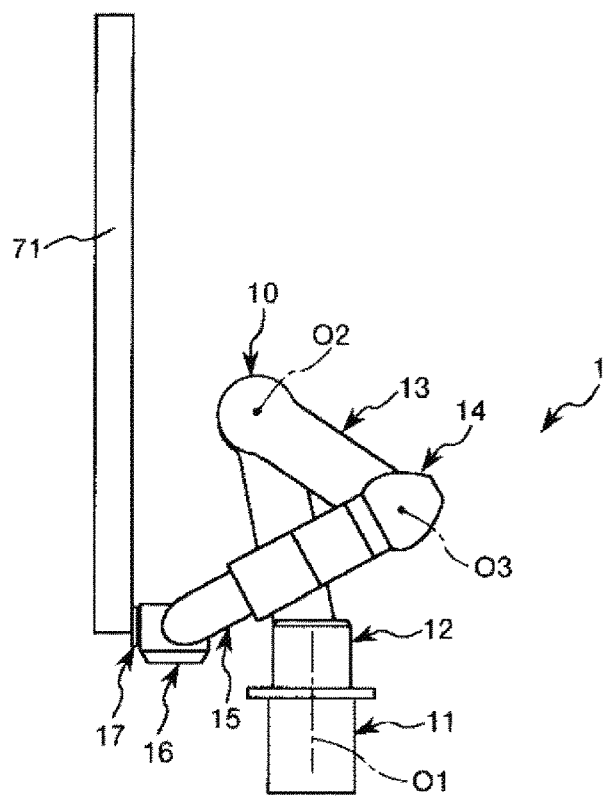
FIG. 10 is a schematic side view illustrating a work region of the robot illustrated in FIG. 1.
Figure 11:
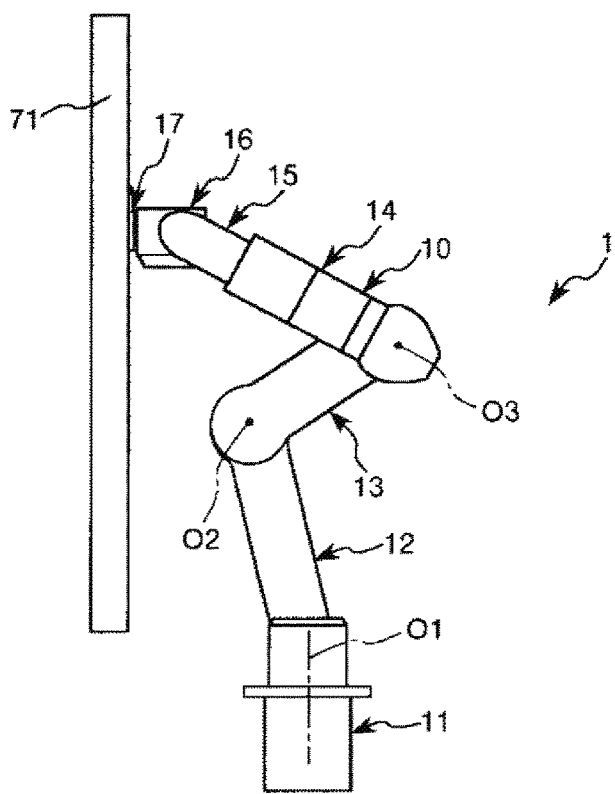
FIG. 11 is a schematic side view illustrating the work region of the robot illustrated in FIG. 1.
Figure 12:
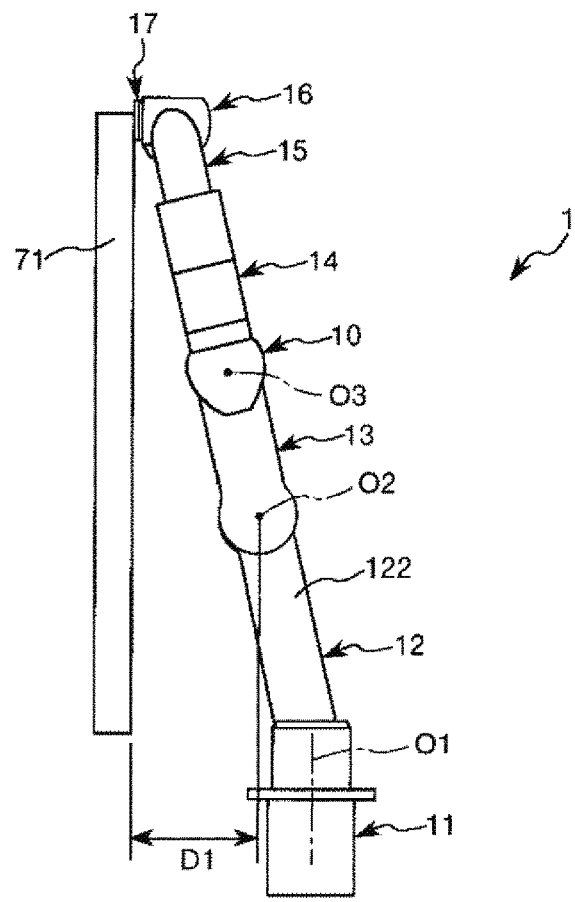
FIG. 12 is a schematic side view illustrating the work region of the robot illustrated in FIG. 1.

FIG. 7 is a diagram illustrating a moving route of a distal end of the robotic arm in an operation of the robot illustrated in FIGS. 4 to 6. FIG. 8 is a schematic side view illustrating a first state of the robot illustrated in FIG. 1. FIG. 9 is a schematic top view illustrating the first state of the robot illustrated in FIG. 1. FIGS. 10 to 12 are schematic side views illustrating work regions of the robot illustrated in FIG. 1, respectively.

As illustrated in FIG. 4, the first arm 12 is set to be longer than the second arm 13 in length. Here, the length of the first arm 12 is a distance between the second rotation axis O2 and an intersection point P1 between the first rotation axis O1 and a connection surface (connection portion) between the first arm 12 and the base 11, when viewed in the axial direction of the second rotation axis O2. In addition, the length of the second arm 13 is a distance between the second rotation axis O2 and the third rotation axis O3, when viewed in the axial direction of the second rotation axis O2. Hence, in the robot 1, when viewed in the axial direction of the second rotation axis O2, the length of a second line L1 as a line connecting the second rotation axis O2 and the intersection point P1 is set to be longer than a first line L2 as a line connecting the second rotation axis O2 and the third rotation axis O3.

When viewed in the axial direction of the second rotation axis O2, the length of the first arm 12 may be set as a distance between the second rotation axis O2 and a center line 611 extending in the vertical direction in FIG. 4 of a bearing 61 (member provided in the joint 171) that rotatably supports the first arm 12. When viewed in the axial direction of the second rotation axis O2, the length of the first arm 12 may be set as a distance between the distal end surface (end surface on a side opposite to the base 11) of the first arm 12 and the connection surface between the first arm 12 and the base 11. In addition, when viewed in the axial direction of the second rotation axis O2, the length of the second arm 13 may be set as a distance between the distal end surface of the second arm 13 and the proximal end surface of the second arm 13.

As illustrated in FIG. 5, when viewed in the axial direction of the second rotation axis O2, the robot 1 has a configuration in which it is possible to overlap the first arm 12 and the second arm 13. In other words, when viewed in the axial direction of the second rotation axis O2, the robot 1 has a configuration in which it is possible to have an angle θ1 of 0° between the first arm 12 and the second arm 13 illustrated in FIG. 4. Here, the angle θ1 is an angle between the first line L2 and the second line L1 when viewed from the second rotation axis O2. In addition, in the robot 1, it is possible to have an angle θ12 of 0° between the central axis A13 of the second arm 13 when viewed from the second rotation axis O2, and a central axis A12 of the second portion 122 of the first arm 12 when viewed from the second rotation axis O2.

As illustrated in FIG. 5, when viewed in the axial direction of the second rotation axis O2, the robot 1 has a configuration in which it is possible to overlap the second arm 13 and the third arm 14. In other words, when viewed in the axial direction of the second rotation axis O2 illustrated in FIG. 4, the robot 1 has a configuration in which it is possible to have an angle of 0° between the central axis A13 of the second arm 13 when viewed from the second rotation axis O2, and a central axis A14 of the third arm 14, when viewed in the axial direction of the second rotation axis O2. Hence, when viewed in the axial direction of the second rotation axis O2, the robot 1 has a configuration in which it is possible to simultaneously overlap the first arm 12, the second arm 13, and the third arm 14.

Figure 14:
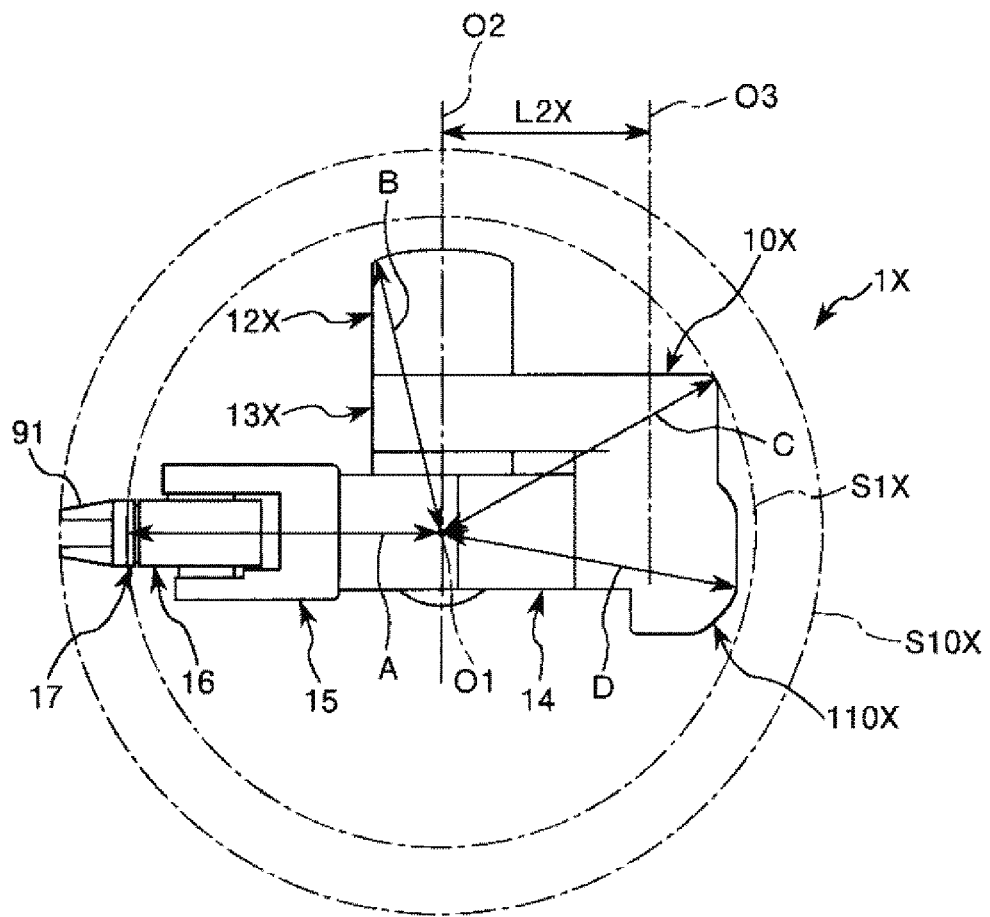
FIG. 14 is a schematic top view illustrating the robot of the reference example illustrated in FIG. 13.

As illustrated in FIG. 14, a total length of the third arm 14, the fourth arm 15, and the fifth arm 16 is set to be longer than the length of the second arm 13. Here, the total length of the third arm 14, the fourth arm 15, and the fifth arm 16 is a distance between the third rotation axis O3 and the fifth rotation axis O5, when viewed in the axial direction of the second rotation axis O2. Hence, when viewed in the axial direction of the second rotation axis O2, a third line L3 as a line connecting the third rotation axis O3 and the fifth rotation axis O5 is set to be longer than the first line L2. Note that the total length of the third arm 14, the fourth arm 15, and the fifth arm 16 and the length of the third line L3 are a length of the fourth rotation axis O4 and the sixth rotation axis O6 when the rotation axes are coincident with each other, as illustrated in FIG. 4.

As described above, in the robot 1 including the robotic arm 10, it is possible to overlap the first arm 12, the second arm 13, and the third arm 14, when viewed in the axial direction of the second rotation axis O2. Therefore, as illustrated in FIGS. 4 to 6, rotation of the second arm 13 and the third arm 14 without rotation of the first arm 12 enables the distal end of the robotic arm 10 to move to a position different by 180° around the first rotation axis O1. Specifically, as illustrated in FIG. 4, in the robot 1, it is possible to drive the robotic arm 10 by passing from a state in which the first arm 12, the second arm 13, and the third arm 14 do not overlap each other, through a state in which the first arm 12 and the second arm 13 overlap each other, when viewed in the axial direction of the second rotation axis O2, as illustrated in FIG. 5, to a state in which the first arm 12, the second arm 13, and the third arm 14 do not overlap each other, as illustrated in FIG. 6. In this manner, as illustrated in FIG. 7, it is possible for the robot 1 to perform an operation of causing the distal end of the robotic arm 10 to move as illustrated with an arrow 64, without performing an operation of causing the distal end of the robotic arm 10 to move as illustrated with arrows 62 and 63. In other words, in the robot 1, it is possible to perform an operation of causing the distal end of the robotic arm 10 to move following a straight line, when viewed in the axial direction of the first rotation axis O1. Therefore, it is possible to reduce a space in which the members of the robot 1 are prevented from interference.

As described above, since it is possible to reduce a space in which the members of the robot 1 are prevented from interference, it is possible to reduce an area S (installation area) of an installation space for installing the robot system 100 so as to be smaller than an area SX (represented by a two-dot chain line) of the installation space in the related art. Specifically, as illustrated in FIG. 7, a width W of the installation space of the robot system 100 is smaller than a width WX of the installation space in the related art, and, for example, to be 80% or less of the width WX, and particularly to 70% or less thereof. Therefore, it is possible to reduce a work region in the width direction (direction of a production line) of the robot system 100. In this manner, it is possible to dispose more robot systems 100 along the production line per unit length, and it is possible to shorten the production line. In addition, similarly, it is possible to reduce the height (length in the vertical direction) of the installation space of the robot system 100 such that the height is reduced to be lower than that in the related art, and specifically, it is possible to reduce the height to 80% or lower in the related art.

In addition, the total length of the third arm 14, the fourth arm 15, and the fifth arm 16 is set to be longer than the length of the second arm 13. Therefore, when viewed in the axial direction of the second rotation axis O2, it is possible to cause the distal end of the robotic arm 10 to project from the second arm 13 in a state in which the arms 12 to 14 overlap each other. In this manner, the hand 91 can be prevented from interfering with the first arm 12 and the second arm 13.

In addition, as illustrated above, the first arm 12 (n-th arm) is longer than the second arm 13 ((n+1)-th arm) in length. Therefore, when the first arm 12 and the second arm 13 overlap each other in the view in the axial direction of the second rotation axis O2, it is possible for the second arm 13 to avoid interference with the first arm 12.

In addition, as described above, the first arm 12 (n-th arm (n is 1)) is provided on the base 11 and the first arm 12 and the base 11 are connected to each other. In this manner, it is possible for the first arm to rotate with respect to the base 11. In addition, the arms, which are able to overlap each other, are the first arm 12 that is provided on the base 11, and the second arm 13 connected to the first arm 12, respectively, and thereby it is possible to reduce the space in which the robot 1 is prevented from interference.

In addition, as illustrated in FIG. 8, when viewed in the axial direction of the second rotation axis O2, the robot 1 may have a state in which the second arm 13 and the third arm 14 overlap each other, and the first line L2 is orthogonal to the first rotation axis O1. A state illustrated in FIG. 8 is the first state.

As illustrated in FIG. 9, in the robot 1, in the first state, the manipulator 110 is positioned on the inner side of a first circle S10, when viewed in the axial direction of the first rotation axis O1. when viewed in the axial direction of the first rotation axis O1, the first circle S10 is formed with the first rotation axis O1 as the center, and with a first length A1 between the distal end of the manipulator 110 (in the embodiment, between two fingers of the hand 91) and the first rotation axis O1, as the radius.

Hence, in the first state, when viewed from the first rotation axis O1, the outermost diameter of the first arm 12 (portion most separated from the first rotation axis O1 of an outline of the first arm 12), the outermost diameter of the second arm 13 (portion most separated from the first rotation axis O1 of an outline of the second arm 13), and the outermost diameter of the third arm 14 (portion most separated from the first rotation axis O1 of an outline of the third arm 14) are positioned on the inner side of the first circle S10. Therefore, as illustrated in FIG. 9, in the first state, when viewed from the first rotation axis O1, a third length B between the first rotation axis O1 and the outermost diameter of the first arm 12, a fourth length C between the first rotation axis O1 and the outermost diameter of the second arm 13, and a fifth length D between the first rotation axis O1 and the outermost diameter of the third arm 14 are all shorter than the first length A1.

As described above, in the first state, when viewed in the axial direction of the first rotation axis O1, the manipulator 110 is positioned on the inner side of the first circle S10, and thereby it is possible for the manipulator 110 to avoid interference with peripheral equipment or the like, for example, even when the first arm 12 is caused to rotate by 180° around the first rotation axis O1. Therefore, it is possible to efficiently perform various types of work even in a relatively narrow space, without considering the interference with the robotic arm 10. In addition, since it is possible for the robotic arm 10 to avoid the interference, it is possible to easily perform layout of the robot 1, peripheral equipment, or the like, regardless of the installation position of the robot 1, a rotating range of the first arm 12, or the like.

In the first state, in a view from the second rotation axis O2, when the outline of the manipulator 110 is positioned on the inner side of the first circle S10 or on the first circle S10, it is possible to remarkably achieve effects in that it is possible for the manipulator 110 to avoid interference with peripheral equipment or the like. In other words, it is possible to remarkably achieve the effects described above when the manipulator 110 is positioned on the inner side of the first circle S10 or is in contact with the first circle S10.

In addition, as described above, the manipulator 110 is provided with the robotic arm 10 that includes the first arm 12 (n-th arm), the second arm 13 ((n+1)-th arm), and the third arm 14 ((n+2)-th arm), and the hand 91 as the end effector that is provided on the robotic arm 10. In the embodiment, as illustrated in FIG. 9, in the robot 1, in the first state, the outline of the robotic arm 10 provided in the manipulator 110 is positioned on the second circle S1 and on the inner side of a second circle S1, when viewed in the axial direction of the first rotation axis O1 (n-th rotation axis). When viewed in the axial direction of the first rotation axis O1, the second circle S1 is formed with the first rotation axis O1 as the center, and with a second length A between the distal end of the robotic arm 10 (in the embodiment, the center of the distal end surface of the sixth arm 17) and the first rotation axis O1, as a radius.

Specifically, in the embodiment, in the first state, the outermost diameter of the first arm 12 and the outermost diameter of the second arm 13 are positioned on the second circle S1 and the outermost diameter of the third arm 14 is positioned on the inner side of the second circle S1, when viewed in the first rotation axis O1. Therefore, in the first state, the third length B and the fourth length C are equal to the second length A, and the fifth length D is shorter than the second length A, when viewed from the first rotation axis O1.

As described above, when viewed in the axial direction of the first rotation axis O1, the outline of the robotic arm 10 is positioned on the second circle S1 and on the inner side of the second circle S1, and thereby it is possible for the manipulator 110 to avoid interference with peripheral equipment or the like, for example, when the first arm 12 is caused to rotate, regardless of a type, a shape, or the like of manipulator such as the hand 91. In other words, it is possible to remarkably achieve the effects described above when the robotic arm 10 is positioned on the inner side of the second circle S1 or is in contact with the second circle S1.

In particular, since the third length B is substantially equal to the second length A, it is possible for the manipulator 110 to avoid interference with peripheral equipment or the like, for example, even when the first arm 12 is caused to rotate by 180° around the first rotation axis O1. In addition, it is possible to broaden a movable range of the robotic arm 10, and it is possible to cause the distal end of the robotic arm 10 to move in a broad range. Further, it is easy to know the movable range of the robotic arm 10, and it is possible to easily set the layout of the robot 1, peripheral equipment, or the like. When the third length B is equal to or shorter than the second length A, it is possible to remarkably exhibit the effect described above. In addition, in terms of easy setting of the layout of the robot 1 and peripheral equipment or broadening of the movable range of the robotic arm 10, preferably, a relationship of third length B≥0.5×second length A is satisfied, and, more preferably, a relationship of third length B≥0.7×second length A is satisfied. In addition, even in a relationship with the first length A1, preferably, a relationship of third length B≥0.5×first length A1 is satisfied, and, more preferably, a relationship of third length B≥0.7× first length A1 is satisfied.

In addition, since the fourth length C is substantially equal to the second length A, it is possible to increase the length of the second arm 13 while avoiding interference with peripheral equipment, and it is possible to broaden a range in which the distal end of the robotic arm 10 can move. In addition, it is easy to know the movable range of the robotic arm 10, and it is possible to easily set the layout of the robot 1, peripheral equipment, or the like. When the fourth length C is equal to or shorter than the second length A, it is possible to remarkably exhibit the effect described above. In addition, in terms of further broadening the range in which the distal end of the robotic arm 10 can move, preferably, a relationship of fourth length C≥0.5×second length A is satisfied, and, more preferably, a relationship of fourth length C≥0.7×second length A is satisfied. In addition, even in a relationship with the first length A1, preferably, a relationship of fourth length C≥0.5×first length A1 is satisfied, and, more preferably, a relationship of fourth length C≥0.7×first length A1 is satisfied.

In addition, as described above, since the fifth length D is shorter than the second length A, it is possible to increase the length of the third arm 14 while avoiding interference with peripheral equipment, and it is possible to broaden a range in which the distal end of the robotic arm 10 can move. Here, in the embodiment, since the second arm 13 is elongated, and thereby the range, in which the distal end of the robotic arm 10 can move, is broadened, it is possible to sufficiently broaden the range in which the distal end of the robotic arm 10 can move, even when the third arm 14 is not elongated to be longer than necessary. When the fifth length D is equal to or shorter than the second length A, it is possible to remarkably exhibit the effect described above. In addition, in terms of further broadening the range in which the distal end of the robotic arm 10 can move, preferably, a relationship of fifth length D≥0.5×second length A is satisfied, and, more preferably, a relationship of fifth length D≥0.7×second length A is satisfied. In addition, even in the relationship with the first length A1, preferably, a relationship of fifth length D≥0.5×first length A1 is satisfied, and, more preferably, a relationship of fifth length D≥0.7×first length A1 is satisfied.

In addition, as described above, the first rotation axis O1 and the second rotation axis O2 are positioned at a torsional position. Therefore, as illustrated in FIG. 4, the second rotation axis O2 is separated from the first rotation axis O1 by the distance D0, when viewed in an axial direction of the second rotation axis O2. Therefore, it is possible to particularly easily access the side of the robot 1 and the installation surface side (base 11 side) of the robot 1. Therefore, it is possible to perform various types of work according to application, a purpose, or the like of the robot 1.

Here, an angle θ between the second line L1 and the first rotation axis O1 (n-th rotation axis) is, preferably, larger than 0° and smaller than 45°, and, more preferably, larger than 5° and smaller than 30°. In this manner, it is possible for the manipulator 110 to stably operate, and it is possible to broaden the range in which the distal end of the manipulator 110 can move on the side of the robot 1 and in the vicinity of the base 11 while avoiding interference with the robot 1 itself (for example, the base 11 or the first arm 12) or peripheral equipment. As described above, the second line L1 is a line connecting the second rotation axis O2, when viewed in the axial direction of the second rotation axis O2 ((n+1)-th rotation axis), and the connection surface (connection portion) between the first arm 12 (n-th arm) and the base 11. Particularly, in the embodiment, the second line L1 is a line connecting between the second rotation axis O2, when viewed in the axial direction of the second rotation axis O2, and the intersection point P1.

In addition, as illustrated in FIG. 8, the second arm 13 is movable through rotating by 180° around the second rotation axis O2 from the first state with the second rotation axis O2 as the center in an arrow R11 direction (counterclockwise direction in FIG. 8), and is set to be movable through rotating by 180° in an arrow R12 direction (clockwise direction in FIG. 8). Here, a circle R1 represents a movable range of the third rotation axis O3 with the second rotation axis O2 as the center. Hence, it is possible to cause the second arm 13 to move in a range on the inner side of the circle R1.

As described above, in the robot 1, with the position of the second arm 13 in the first state as a reference, the second arm 13 is set to be movable through rotating by 180° with the second rotation axis O2 as the center in each of the arrow R11 direction and the arrow R12 direction. Therefore, as illustrated in FIG. 10, when viewed in the axial direction of the second rotation axis O2, it is possible to change the state from the first state to a state in which the first arm 12 and the third arm 14 intersect with each other in FIG. 8. In addition, as illustrated in FIG. 11, when viewed in the axial direction of the second rotation axis O2, it is possible to change the state from the state illustrated in FIG. 10 to a state in which the first arm 12, the second arm 13, and the third arm 14 do not overlap each other. Further, the second arm 13 is caused to rotate from the state illustrated in FIG. 11 in the arrow R11 direction in FIG. 8, and thereby, as illustrated in FIG. 12, when viewed in the axial direction of the second rotation axis O2, it is possible to change the state to a state in which the second portion 122 of the first arm 12 and the arms 13 to 15 are aligned.

Since it is possible to have such states, for example, it is possible to cause the distal end of the robotic arm 10 to move within a work region 71 on the side of the robot 1 as illustrated in FIGS. 10 to 12. It is possible to determine the work region 71 as illustrated in FIGS. 10 to 12 with the position of the distal end of the robotic arm 10 in the first state illustrated in FIG. 8, as a reference, and according to the determination method, it is possible to broaden the work region 71 in the range in which the distal end of the robotic arm 10 can move on the side of the robot 1.

Figure 13:
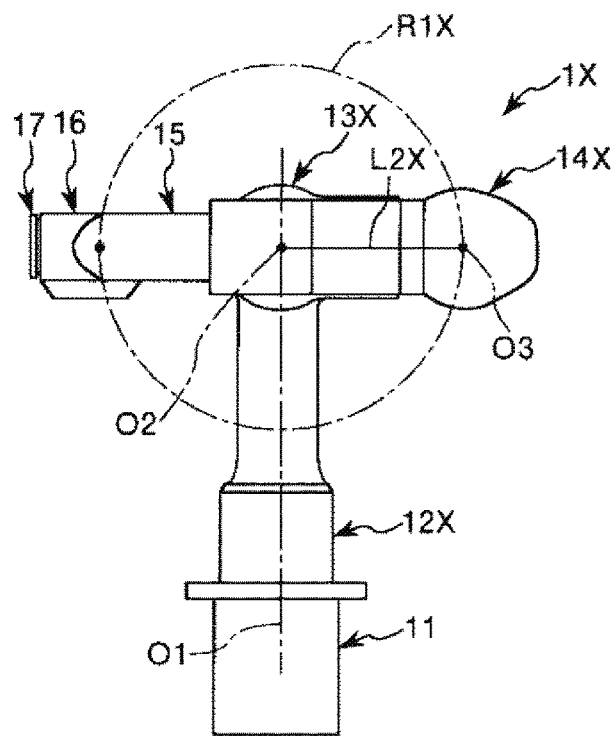
FIG. 13 is a schematic side view illustrating a robot of a reference example.
Figure 15:
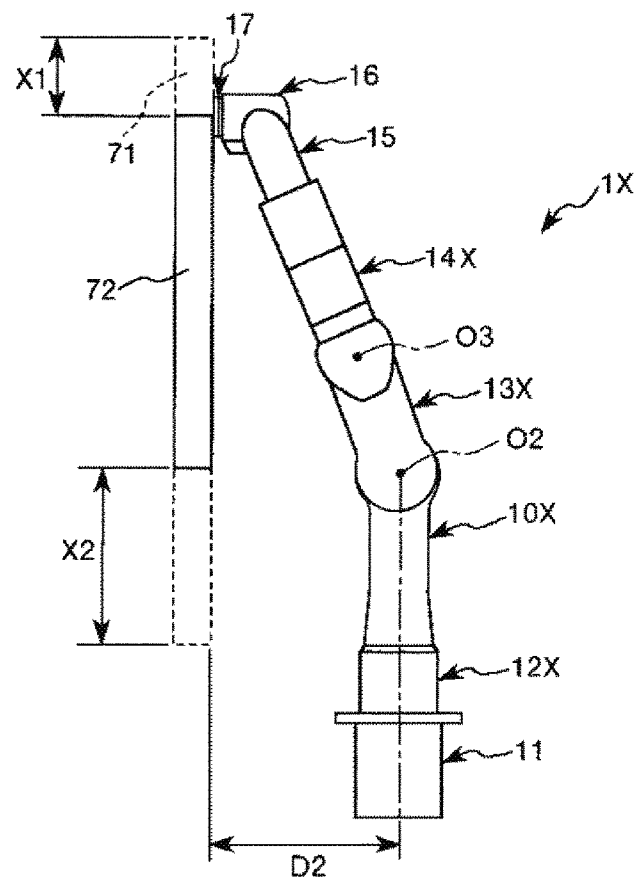
FIG. 15 is a schematic side view illustrating the robot of the reference example illustrated in FIG. 13.

FIGS. 13 to 15 illustrate a robot 1X of a reference example.

FIG. 13 is a schematic side view illustrating the robot of the reference example. FIG. 14 is a schematic top view illustrating the robot of the reference example illustrated in FIG. 13. FIG. 15 is a schematic side view illustrating the robot of the reference example illustrated in FIG. 13. FIG. 13 corresponds to FIG. 8, FIG. 14 corresponds to FIG. 9, and FIG. 15 corresponds to FIG. 12.

The robot 1X as a reference example is the vertical articulated (six axes) robot that includes a first arm 12X, a second arm 13X, a third arm 14X, a fourth arm 15, a fifth arm 16, and a sixth arm 17. In the robot 1X, the first arm 12X does not have the inclined portion when viewed from the second rotation axis O2, and the second rotation axis O2 and the first rotation axis O1 intersect with each other. Therefore, in the robot 1X, the second rotation axis O2 is positioned on the first rotation axis O1 when viewed from the second rotation axis O2, the first rotation axis O1 and the second rotation axis O2 are not separated from each other when viewed from the second rotation axis O2.

In the robot 1X having such a configuration, as illustrated in FIG. 14, when viewed from the first rotation axis O1, when a manipulator 110X is positioned on the inner side of a first circle S10X (circle corresponding to the first circle S10), a first line L2X (length corresponding to the first line L2) is equal to or shorter than the radius of the first circle S10X. Similarly, when viewed from the second rotation axis O2, when a robotic arm 10X is positioned on the inner side of a second circle S1X (circle corresponding to the second circle S1), a first line L2X is equal to or shorter than the radius of the second circle S1X. Therefore, as found by comparing FIG. 9 with FIG. 14, the first line L2X is shorter than the first line L2, and the second arm 13X of the robot 1X is shorter than the second arm 13 of the robot 1 in length.

Hence, according to the robot 1 of the embodiment, it is possible to further broaden the movable range of the robotic arm 10 than in the robot 1X. Therefore, it is possible to further broaden the work region 71 than to broaden a work region 72 (a range in which a distal end of the robotic arm 10X can move on the side of the robot 1X) in the robot 1X illustrated in FIG. 15. In particular, it is possible to broaden a region X1 on the upper side and a region X2 on the lower side further than the work region 72. The region X1 on the upper side is longer than a difference between the length of the second arm 13 and the length of the second arm 13X. This is because, in the robot 1, not only the second arm 13 is long, but also the first arm 12 has the portion that is inclined with respect to the first rotation axis O1. In other words, the region X2 on the lower side is formed, because, in addition to the long second arm 13, a distance D1 between the second rotation axis O2 and the work region 71 of the robot 1 illustrated in FIG. 12 is shorter than a distance D2 between the second rotation axis O2 and the work region 72 of the robot 1X illustrated in FIG. 15. In addition, the region X2 on the lower side is formed, because the first arm 12 included in the robot 1 has the portion that is inclined with respect to the first rotation axis O1. Since the first arm 12 included in the robot 1 has the portion that is inclined with respect to the first rotation axis O1, it is possible to perform work while avoiding interference with the robotic arm 10 even in the region X2 on the lower side (a region on the base 11 side).

As described above, the robot 1 according to the invention is described.

The robot 1 as an example according to the robot of the invention includes the manipulator 110 that is provided with the first arm 12 (n-th (n is an integer of 1 or larger) arm) which is capable of rotating around the first rotation axis O1 (n-th rotation axis), the second arm 13 ((n+1)-th arm) provided on the first arm 12 so as to be capable of rotating around the second rotation axis O2 ((n+1)-th rotation axis) having an axial direction which is different from the axial direction of the first rotation axis O1, and the third arm 14 ((n+2)-th arm) provided on the second arm 13 so as to be capable of rotating around the third rotation axis O3 ((n+2)-th rotation axis). In addition, in the robot 1, when the first arm 12 and the second arm 13 overlap each other in a view in the axial direction of the second rotation axis O2, it is possible to overlap the second arm 13 and the third arm 14. In addition, in the robot 1, the second rotation axis O2 is separated from the first rotation axis O1, when viewed in the axial direction of the second rotation axis O2. In the robot 1, in the first state, the outline of the manipulator 110, when viewed in the axial direction of the first rotation axis O1, is positioned on the inner side of the first circle S10 or on the first circle S10 with the first rotation axis O1 as the center thereof, and with the first length A1 between the distal end of the manipulator 110 and the first rotation axis O1, as a radius. As described above, the first state changes to the state in which the second arm 13 and the third arm 14 overlap each other, and the first line L2 is orthogonal to the first rotation axis O1, when viewed in the axial direction of the second rotation axis O2. In addition, the first line L2 is a line connecting the second rotation axis O2 and the third rotation axis O3 on the second arm 13, when viewed in the axial direction of the first rotation axis O1.

According to the robot 1, it is possible to reduce the space in which the robot 1 is prevented from interference, and it is possible to efficiently perform various types of work while avoiding interference with the manipulator 110 even in a relatively narrow space.

In addition, as described above, the second rotation axis O2 ((n+1)-th rotation axis) is parallel to the third rotation axis O3 ((n+2)-th rotation axis). In this manner, it is possible to efficiently overlap the first arm 12, the second arm 13, and the third arm 14, when viewed in the axial direction of the second rotation axis O2, and it is possible to efficiently perform various types of work while avoiding interference with the robot 1.

In addition, as described above, in the robot 1 since it is possible to perform the operation of causing the hand 91 to move as indicated by an arrow 64, it is possible to make the first arm 12 not to rotate or to reduce a rotation angle (rotation amount) of the first arm 12 when the hand 91 is caused to move to a position different by 180° around the first rotation axis O1. The rotation angle of the first arm 12 around the first rotation axis O1 is reduced, and thereby it is possible to reduce the rotation of the first arm 12 having the portions (second portion 122 and third portion 123) that overhang outward from the base 11, when viewed in the axial direction of the first rotation axis O1. Therefore it is possible to reduce interference of the robot 1 with peripheral equipment.

In addition, as described above, in the robot 1, since it is possible to perform the operation of causing the distal end of the robotic arm 10 to move straightly along a line, when viewed in the axial direction of the first rotation axis O1, it is possible to reduce the movement of the robot 1, and it is possible to efficiently drive the robot 1. Therefore, it is possible to shorten takt time and it is possible to improve work efficiency. In addition, since it is possible to cause the distal end of the robotic arm 10 to move straightly along a line, it is easy to know the movement of the robot 1.

Here, when the operation of causing the distal end of the robotic arm 10 to move to a position different by 180° around the first rotation axis O1 is performed by simply causing the first arm 12 to rotate around the first rotation axis O1 as in the robot in the related art, there is a concern that the robot 1 will interfere with peripheral devices (peripheral equipment). Therefore, it is necessary to instruct the robot 1 in retraction point such that the interference is avoided. For example, when only the first arm 12 is caused to rotate by 90° around the first rotation axis O1, and the robot 1 interferes with the peripheral devices, it is necessary to instruct the robot 1 in multiple retraction points such that the robot does not interfere with the peripheral devices. In the robot in the related art, it is necessary to instruct the robot in multiple retraction points, a large number of retraction points need to be prepared, and time and effort are required for the instruction.

In this respect, in the robot 1, in a case where the operation of causing the distal end of the robotic arm 10 to move to the position different by 180° around the first rotation axis O1, it is possible to perform the operation of causing the distal end of the robotic arm 10 to move straightly along a line, when viewed in the axial direction of the first rotation axis O1. Therefore, it is possible to largely decrease the region or portion in which there is a concern that interference will occur. Therefore, it is possible to reduce the number of retraction points and it is possible to reduce time and effort taken for the instruction. In other words, in the robot 1, the number of retraction points which are instructed may be about one third of that in the robot in the related art, and thus instruction thereof is remarkably easily performed.

In addition, in the robot 1, a region (portion) 105 of the third arm 14 and the fourth arm 15, which is surrounded in a two-dot chain line on the left side in FIG. 2, is a region (portion) in which the robot 1 does not interfere with the robot 1 itself and another member or interference is unlikely to occur. Therefore, in a case where a predetermined member is mounted in the region 105, the member is unlikely to interfere with the robot 1, the peripheral devices, or the like. Therefore, in the robot 1, it is possible to mount a predetermined member in the region 105.

Examples that can be mounted in the region 105 include a control device that controls drive of a hand or a sensor such as a hand eye camera, and a solenoid valve of a suctioning mechanism.

Specifically, for example, when the suctioning mechanism is provided in the hand and the solenoid valve or the like is installed in the region 105, the solenoid valve is not interrupted when the robot 1 is driven. As described above, the region 105 is highly convenient.

In addition, in the robot 1, a region (portion) 106 between the floor and the first arm 12, which is surrounded in a two-dot chain line on the lower right side in FIG. 2, is a region (portion) in which, similar to the region 105 described above, the robot 1 does not interfere with the robot 1 itself and another member or interference is unlikely to occur. In the region 106, the first arm 12 is configured to have the third portion 123. Hence, in the robot 1, it is also possible to mount a predetermined member in the region 106, similar to the region 105.

As described above, the robot system 100 is described. As described above, the robot system 100 as an example of the robot system according to the invention includes the robot 1 as an example of the robot according to the invention and the robot control device 50 as an example of the control device that controls the actuation of the robot 1. According to the robot system 100 according to the invention, since the robot system includes the robot 1 having the configuration described above, it is possible to efficiently perform various types of work while avoiding interference with the robot 1 itself or peripheral equipment even in a relatively narrow space.

Second Embodiment

Next, a second embodiment of the invention will be described.

Figure 16:
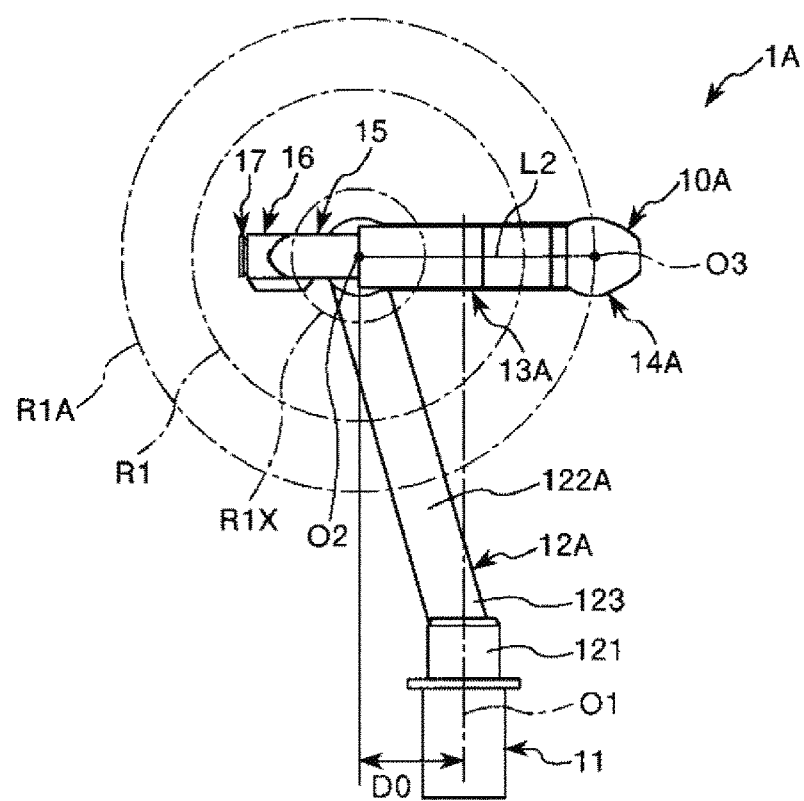
FIG. 16 is a schematic side view illustrating a first state of a robot according to a second embodiment of the invention.
Figure 17:
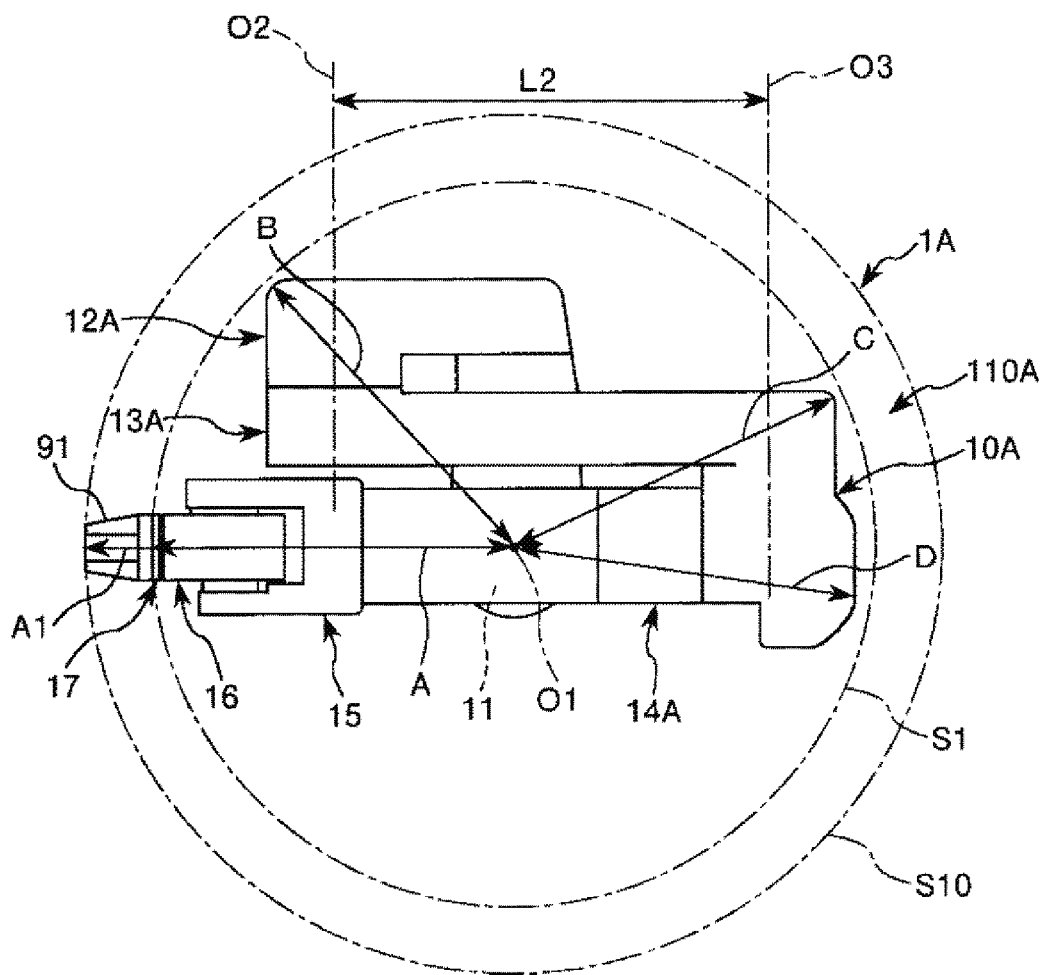
FIG. 17 is a schematic top view illustrating the first state of the robot according to the second embodiment of the invention.
Figure 18:
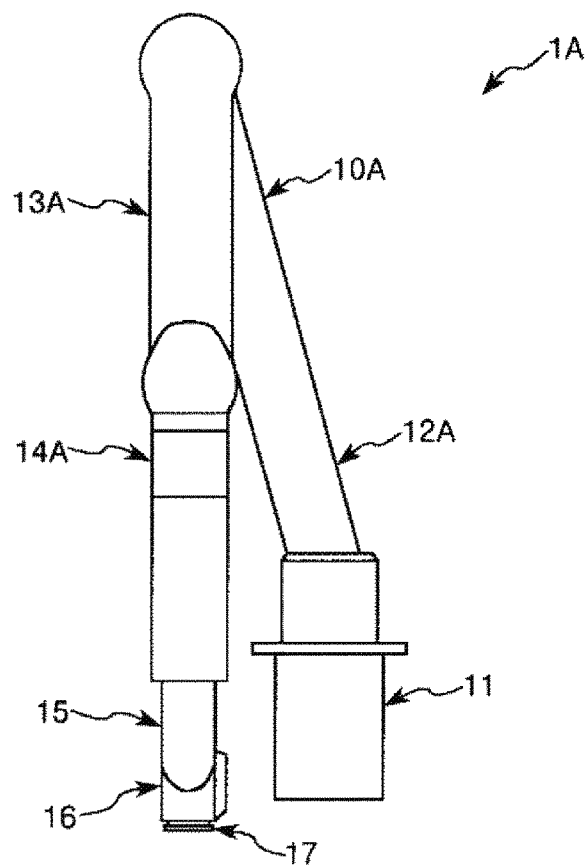
FIG. 18 is a schematic side view illustrating a work region of the robot illustrated in FIG. 16.
Figure 19:
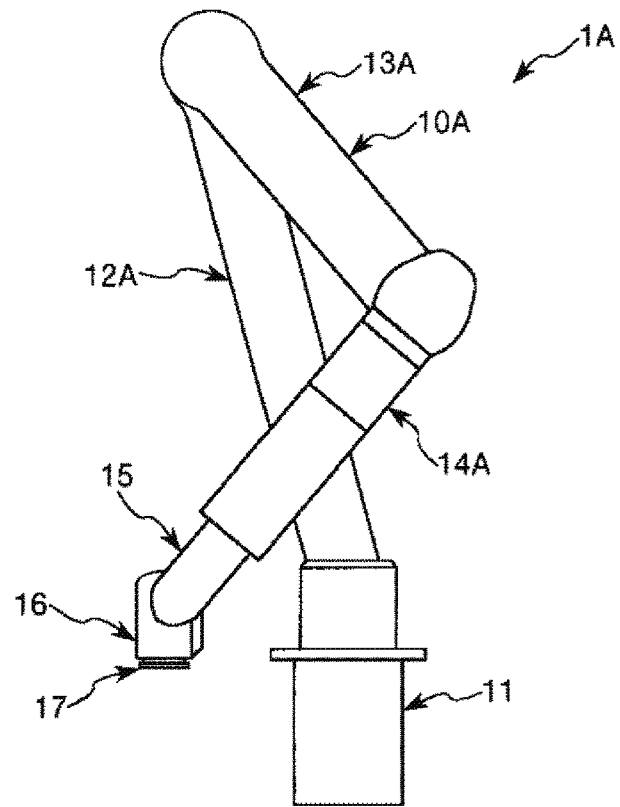
FIG. 19 is a schematic side view illustrating the work region of the robot illustrated in FIG. 16.

FIG. 16 is a schematic side view illustrating a first state of a robot according to a second embodiment of the invention. FIG. 17 is a schematic top view illustrating the first state of the robot according to the second embodiment of the invention. FIGS. 18 and 19 are schematic side views illustrating work regions of the robot illustrated in FIG. 16, respectively.

The robot according to the embodiment is the same as that of the first embodiment described above except for a different configuration of the robotic arm.

The following description related to the second embodiment focuses on differences from the embodiment described above, and the description related to the same members is omitted. In addition, in FIGS. 16 to 19, the same reference signs are assigned to the same configurations as those in the embodiment described above.

A robotic arm 10A provided in the robot 1A illustrated in FIG. 16 is provided with a first arm 12A, a second arm 13A, and a third arm 14A which are longer than the corresponding first arm 12, the second arm 13, and the third arm 14 which are provided in the robot 1 according to the first embodiment.

The first arm 12A includes the first portion 121, a second portion 122A, and the third portion 123, and the second portion 122A is longer than the second portion 122 in the first embodiment. In addition, a distance D0 between the first rotation axis O1 and the second rotation axis O2 is longer than the distance D0 in the first embodiment, when viewed in the axial direction of the second rotation axis O2. In this manner, it is possible to elongate the second arm 13A (length of the first line L2) while a manipulator 110A is positioned in the first circle S10 in the first state. Therefore, as illustrated in FIG. 16, a size of a circle R1A that represents the movable range of the third rotation axis O3 with the second rotation axis O2 as the center is larger than a circle R1X in the robot 1X of the reference example, and it is possible to more increase the circle R1 in the robot 1 of the first embodiment. In other words, the movable range of the second arm 13A is larger than a movable range of the second arm 13X of the robot 1X of the reference example, and, further, it is possible to broaden the movable range of the second arm 13 of the robot 1 of the first embodiment. Therefore, it is possible to more broaden the movable range of the robotic arm 10A, and it is possible to more broaden the range in which the distal end of the robotic arm 10A can move.

Moreover, as illustrated in FIG. 17, also in the robot 1A, the manipulator 110A is positioned in the first circle S10, when viewed from the first rotation axis O1. Therefore, it is possible to more broaden the range in which the distal end of the robotic arm 10A can move while avoiding the interference of the manipulator 110A even in a relatively narrow space. In particular, also in the embodiment, when viewed from the first rotation axis O1, since the outline of the robotic arm 10A is positioned on the second circle S1 or on the inner side of the second circle S1, it is possible to remarkably exhibit the effects described above, regardless of a type, a shape, or the like of end effector such as the hand 91.

In addition, it is possible to increase the second arm 13A in length, and thereby it is possible to increase the third arm 14A in length more than the third arm 14 in the first embodiment. Therefore, it is possible to broaden the movable range of the robotic arm 10.

In addition, in the robot 1A, as illustrated in FIG. 17, the connection surface (connection portion) between the first arm 12A and the second arm 13A does not overlap the base 11, but is positioned on the outer side of the base 11, when viewed from the first rotation axis O1. Therefore, as illustrated in FIG. 18, it is possible to particularly easily access the installation surface side (base 11 side) of the robot 1A.

In addition, when the state returns to the first state illustrated in FIG. 16 from the state illustrated in FIG. 18, and the second arm 13A and the third arm 14A are caused to even simultaneously rotate, as illustrated in FIG. 19, the first arm 12A has the portion inclined with respect to the first rotation axis O1. Therefore, it is possible for the second arm 13A and the third arm 14A to avoid interfering with the first arm 12A. Therefore, it is possible to efficiently overlap the second arm 13A and the third arm 14A.

Also according to the robot 1A having such a configuration, it is possible to efficiently perform various types of work while avoiding the interference of the manipulator 110A even in a relatively narrow space.

As described above, the robot, the control device, and the robot system according to the invention are described on the basis of the embodiments in the figures; however, the invention is not limited thereto, and it is possible to replace the configurations of the members with any configurations having the same functions. In addition, another component may be attached. In addition, the invention may be embodied as a combination of two or more configurations (characteristics) of the embodiments described above.

In addition, in the embodiments described above, the robotic arm included in the robot has six rotation axes; however, the invention is not limited thereto, and the robotic arm may have, for example, two, three, four, five, seven, or more rotation axes. In addition, in the embodiments described above, the robot has six arms; however, the invention is not limited thereto, and the robot may have, for example, two, three, four, five, seven, or more arms.

In addition, in the embodiments described above, the robot has one manipulator; however, the invention is not limited thereto, and the robot may have, for example, two or more manipulators. In other words, the robot may be a multi-arm robot such as a double-arm robot.

In addition, in the embodiments described above, in a condition (relationship) between the n-th rotation axis, the n-th arm, the (n+1)-th rotation axis, and the (n+1)-th arm, a case where n is 1, that is, a case where the condition is satisfied in the first rotation axis, the first arm, the second rotation axis, and the second arm is described; however, the invention is not limited thereto, when n is an integer of 1 or larger, the same condition as the case where n is 1 may be satisfied when n is any integer of 1 or larger. Hence, for example, when n is 2, that is, in the second rotation axis, the second arm, the third rotation axis, and the third arm, the same condition as the case where n is 1 may be satisfied. In addition, when n is 3, that is, in the third rotation axis, the third arm, the fourth rotation axis, and the fourth arm, the same condition as the case where n is 1 may be satisfied. Further, when n is 4, that is, in the fourth rotation axis, the fourth arm, the fifth rotation axis, and the fifth arm, the same condition as the case where n is 1 may be satisfied. Furthermore, when n is 5, that is, in the fifth rotation axis, the fifth arm, the sixth rotation axis, and the sixth arm, the same condition as the case where n is 1 may be satisfied.

The entire disclosure of Japanese Patent Application No. 2016-076825, filed Apr. 6, 2016 is expressly incorporated by reference herein.

What is claimed is:

1. A robot comprising:
a manipulator that is provided with a first arm configured to rotate about a first rotation axis, a second arm rotatably connected to the first arm and configured to rotate about a second rotation axis having an axial direction which is different from an axial direction of the first rotation axis, and a third arm rotatably connected to the second arm and configured to rotate about a third rotation axis,
wherein the second arm is configured to move to a position where the first arm completely overlaps the second arm, and the third arm is configured to move to a position where the third arm completely overlaps the second arm and overlaps the first arm, when viewed in the axial direction of the second rotation axis,
wherein the first arm includes a first leg and a second leg, the first leg extending orthogonally to the second leg, and when the second arm is in the position where the first arm completely overlaps the second arm and the third arm is in the position where the third arm completely overlaps the second arm, the third arm is closer to the first rotation axis than the second arm, and the second leg completely overlaps the second arm,
wherein the first leg and the second leg intersect in a bend, the second leg extending in an inclined direction from a first end of the second leg at the bend to a second end of the second leg connected to the second arm, the second end of the second leg being offset from the first rotation axis when viewed in the axial direction of the first rotation axis,
wherein the second rotation axis is separated from the first rotation axis, when viewed in the axial direction of the second rotation axis, and
wherein when the third arm is in a position overlapping the second arm when viewed in the axial direction of the second rotation axis, an outline of the manipulator in a first state is positioned within a first circle or on a circumference of the first circle when viewed in the axial direction of the first rotation axis, the first circle having a center on the first rotation axis and a radius of a first length from a distal end of the manipulator to the first rotation axis, the first state of the manipulator being a state in which a first line connecting the second rotation axis and the third rotation axis is orthogonal to the first rotation axis.

2. The robot according to claim 1,
wherein the manipulator is provided with a robotic arm that includes the first arm, the second arm, and the third arm, and an end effector that is provided on the robotic arm, and
wherein, in the first state, an outline of the robotic arm is positioned on an inner side of a second circle or on the second circle with the first rotation axis as the center thereof, and with a second length between a distal end of the robotic arm and the first rotation axis, as a radius, when viewed in the axial direction of the first rotation axis.

3. The robot according to claim 1,
wherein the first arm is longer than the second arm in length.

4. The robot according to claim 1,
wherein the first arm is provided on a base.

5. The robot according to claim 4,
wherein an angle between a second line connecting the second rotation axis and a connection portion between the first arm and the base, and the first rotation axis is larger than 0° and smaller than 45° when viewed in the axial direction of the second rotation axis.

6. The robot according to claim 5,
wherein the angle is larger than 5° and smaller than 30°.

7. The robot according to claim 1,
wherein the second rotation axis is parallel to the third rotation axis.

8. A control device that controls actuation of the robot according to claim 1.

9. The control device according to claim 8,
wherein the control device controls the second arm around the second rotation axis as the center in clockwise direction from the first state, and change the third arm to a second state in which the first arm and the third arm intersect with each other, and
wherein the control device controls the second arm around the second rotation axis as the center in counterclockwise direction from the second state, and the third arm to a third state in which the first arm, the second arm and the third arm do not overlap each other.

10. A robot system comprising:
the robot according to claim 1; and
a control device that controls actuation of the robot.

11. The robot system according to claim 10,
wherein the control device controls the second arm around the second rotation axis as the center in clockwise direction from the first state, and change the third arm to a second state in which the first arm and the third arm intersect with each other, and
wherein the control device controls the second arm around the second rotation axis as the center in counterclockwise direction from the second state, and the third arm to a third state in which the first arm, the second arm and the third arm do not overlap each other.

* * * * *